(12) United States Patent
Saitoh et al.

(10) Patent No.: US 10,001,673 B2
(45) Date of Patent: Jun. 19, 2018

(54) OPTICAL SHEET MEMBER AND IMAGE DISPLAY DEVICE EMPLOYING SAME

(71) Applicant: FUJIFILM Corporation, Tokyo (JP)

(72) Inventors: Yukito Saitoh, Kanagawa (JP); Katsufumi Ohmuro, Kanagawa (JP); Akiko Watano, Kanagawa (JP); Hiroshi Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 99 days.

(21) Appl. No.: 14/959,201

(22) Filed: Dec. 4, 2015

(65) Prior Publication Data
US 2016/0085101 A1 Mar. 24, 2016

Related U.S. Application Data

(63) Continuation of application No. PCT/JP2014/065120, filed on Jun. 6, 2014.

(30) Foreign Application Priority Data

Jun. 6, 2013 (JP) .................. 2013-119669
Jul. 12, 2013 (JP) .................. 2013-146561

(51) Int. Cl.
*G02F 1/13363* (2006.01)
*G02F 1/1335* (2006.01)
(Continued)

(52) U.S. Cl.
CPC .... *G02F 1/13363* (2013.01); *G02F 1/133536* (2013.01); *G02F 1/133617* (2013.01);
(Continued)

(58) Field of Classification Search
CPC ........... G02F 1/13363; G02F 1/133536; G02F 1/133617
See application file for complete search history.

(56) References Cited

U.S. PATENT DOCUMENTS 5,712,694 A    1/1998    Taira et al.
9,110,203 B2    8/2015    Seo et al.
(Continued)

FOREIGN PATENT DOCUMENTS

JP    01-133003 A    5/1989
JP    09-73083 A    3/1997
(Continued)

OTHER PUBLICATIONS

International Preliminary Report on Patentability issued by WIPO dated Dec. 8, 2015 in connection with International Patent Application No. PCT/JP2014/065120.

(Continued)

*Primary Examiner* — Dung Nguyen
(74) *Attorney, Agent, or Firm* — Edwards Neils LLC; Jean C. Edwards, Esq.

(57) ABSTRACT

An optical sheet member includes a polarizing plate including a polarizer, a brightness enhancement film including a reflection polarizer, and a λ/4 plate, in which the reflection polarizer includes a first light reflecting layer which has a reflection center wavelength range of 430 nm to 480 nm, and is formed by fixing a cholesteric liquid crystalline phase emitting circular polarization light, a second light reflecting layer which has a reflection center wavelength range of 500 nm to 600 nm, and a third light reflecting layer which has a reflection center wavelength range of 600 nm to 650 nm, and both formed by fixing a cholesteric liquid crystalline phase emitting circular polarization light, and the brightness enhancement film includes the λ/4 plate satisfying 550 nm/4−25 nm<Re(550)<550 nm/4+25 nm between the polarizer and the reflection polarizer.

13 Claims, 4 Drawing Sheets

(51) Int. Cl.
*G02B 5/22* (2006.01)
*G02B 5/30* (2006.01)
(52) U.S. Cl.
CPC .............. *G02B 5/22* (2013.01); *G02B 5/305* (2013.01); *G02F 2001/133543* (2013.01); *G02F 2001/133614* (2013.01); *G02F 2001/133638* (2013.01)

(56) References Cited

U.S. PATENT DOCUMENTS

| | | | | |
|---|---|---|---|---|
| 2004/0125291 | A1* | 7/2004 | Kawahara | G02B 5/3016 349/117 |
| 2008/0158486 | A1* | 7/2008 | Kim | G02F 1/133555 349/106 |
| 2012/0206935 | A1 | 8/2012 | Seo et al. | |

FOREIGN PATENT DOCUMENTS

| | | |
|---|---|---|
| JP | 2003-131213 A | 5/2003 |
| JP | 3448626 B2 | 7/2003 |
| JP | 2005-189392 A | 7/2005 |
| JP | 2012-507118 A | 3/2012 |
| JP | 2012-169271 A | 9/2012 |
| WO | 95/17699 A1 | 6/1995 |
| WO | 2010/062485 A1 | 6/2010 |

OTHER PUBLICATIONS

International Search Report issued in PCT/JP2014/065120 dated Jul. 22, 2014.
Written Opinion issued in PCT/JP2014/065120 dated Jul. 22, 2014.
Notification of Reasons for Refusal issued by the Japanese Patent Office dated Dec. 20, 2016, in connection with Japanese Patent Application No. 2015-521505.
Office Action, issued by the State Intellectual Property Office of China, dated Feb. 28, 2017 in connection with Chinese Patent Application No. 201480031996.0.
Office Action, issued by the Japanese Patent Office (JPO) dated Oct. 3, 2017, in connection with corresponding Japanese Patent Application No. 2015-521505.
Office Action, issued by the State Intellectual Property Office of China, dated Nov. 8, 2017 in connection with Chinese Patent Application No. 201480031996.0.

* cited by examiner

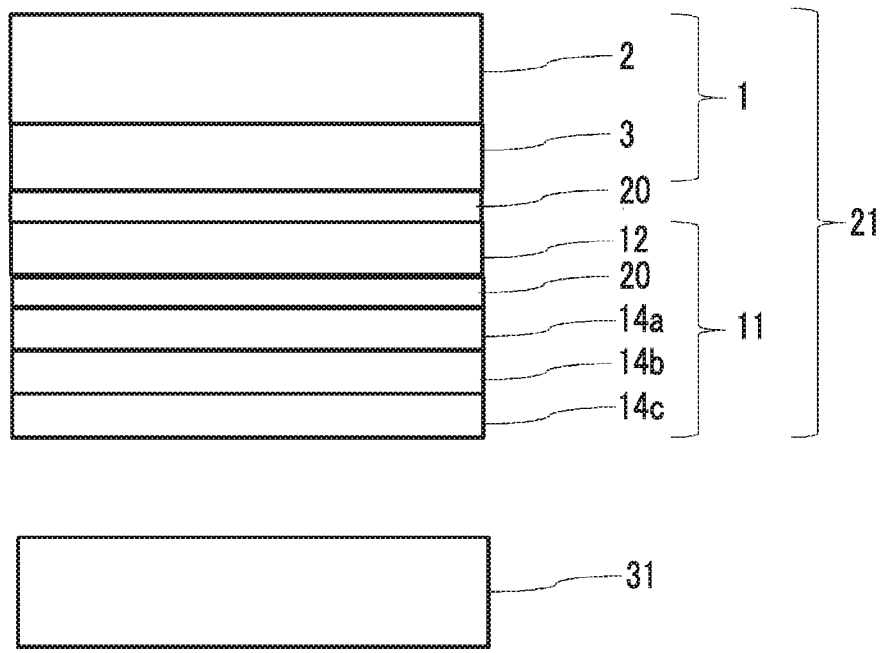
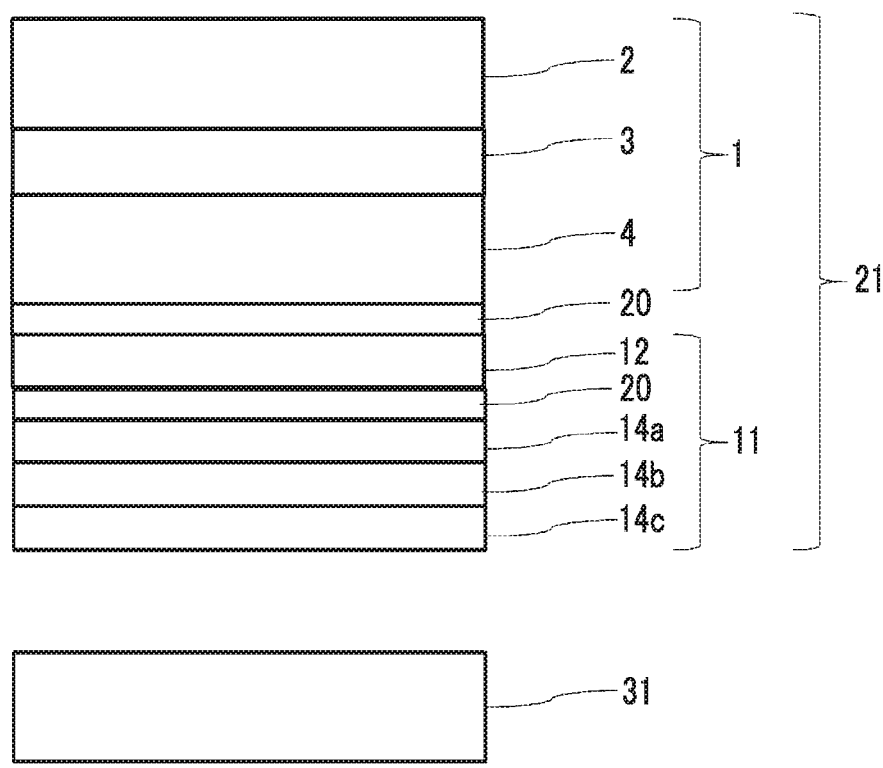

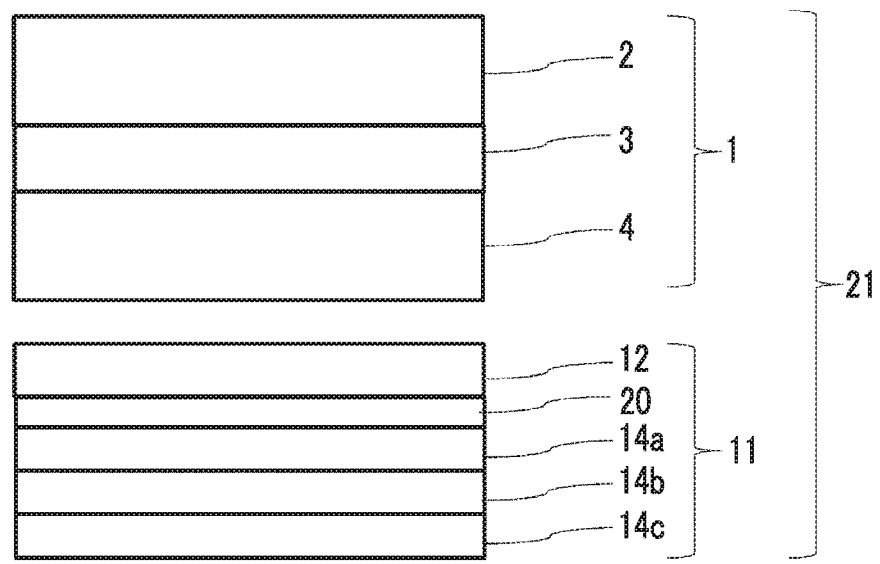
FIG. 3
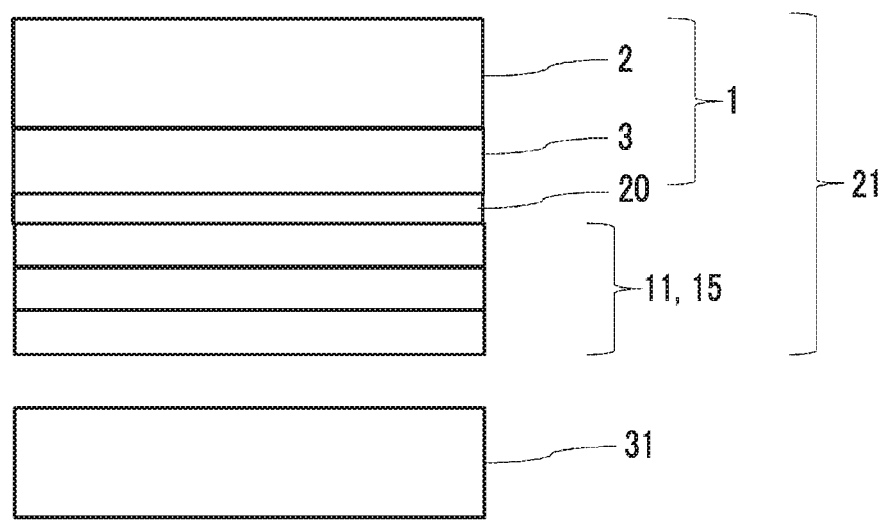
FIG. 4

OPTICAL SHEET MEMBER AND IMAGE DISPLAY DEVICE EMPLOYING SAME

CROSS-REFERENCE TO RELATED APPLICATIONS

This application is a Continuation of PCT International Application No. PCT/JP2014/065120, filed on Jun. 6, 2014, which was published under Article 21(2) in Japanese, and claims priority under 35 U.S.C. Section 119(a) to Japanese Patent Application No. 2013-119669 filed on Jun. 6, 2013 and Japanese Patent Application No. 2013-146561 filed on Jul. 12, 2013. The above applications are hereby expressly incorporated by reference, in their entirety, into the present application.

BACKGROUND OF THE INVENTION

1. Field of the Invention

The present invention relates to an optical sheet member and an image display device employing the same.

2. Description of the Related Art

A flat panel display such as a liquid crystal display device (hereinafter, also referred to as an LCD) has been widely used as an image display device having small power consumption and space saving properties over the years. The liquid crystal display device has a configuration in which backlight (hereinafter, also referred to as BL), a backlight side polarizing plate, a liquid crystal cell, a visible side polarizing plate, and the like are disposed in this order.

In the recent flat panel display market, development for power saving, high definition, and color reproducibility improvement has progressed as an LCD performance enhancement, and currently, power saving, high definition, and color reproducibility improvement have been remarkably required in a small-size device, particularly for example, a tablet PC or a smart phone, but development of next generation high vision (4K2K, an EBU ratio of greater than or equal to 100%) of current TV standards (FHD, National Television System Committee (NTSC) ratio of 72%≅European Broadcasting Union (EBU) ratio of 100%) has progressed in a large-size device. For this reason, the power saving, the high definition, and the color reproducibility improvement of the liquid crystal display device have been increasingly required.

An optical sheet member is disposed between the backlight and the backlight side polarizing plate according to power saving of the backlight, and the optical sheet member is an optical device in which, among incident light rays while vibrating in all directions, only light rays vibrating in a specific polarization direction are transmitted, and light rays vibrating in the other polarization direction are reflected. As a core component of a low power LCD according to an increase in a mobile device and low power consumption in a home electric appliance, improvement of light efficiency of the LCD and an increase in brightness (a degree of brightness per unit area of a light source) have been expected.

In response, a technology has been known in which an optical sheet member (a Dual Brightness Enhancement Film (DBEF) or the like) is combined between the backlight and the backlight side polarizing plate, and thus a light utilization rate of the BL is improved according to optical recycling, and the brightness is improved while saving power of the backlight (refer to JP3448626B). Similarly, in JP1989-133003A (JP-H01-133003A), a technology is disclosed in which a light utilization rate of the BL is improved in the optical recycling according to broadband in a polarizing plate having a configuration in which a λ/4 plate and a layer formed by fixing a cholesteric liquid crystalline phase are laminated and a layer formed by fixing cholesteric liquid crystalline phases of three or more layers having different pitches of the cholesteric liquid crystalline phases.

However, such an optical sheet member has a complicated member configuration, and thus it is necessary to reduce the cost by reducing the number of members in which functions of the members are further integrated in order to spread the optical sheet member to the market.

On the other hand, a method has been known in which a light emitting spectrum of the backlight is sharpened from a viewpoint of high definition of a liquid crystal display device and of improving color reproducibility thereof. For example, in JP2012-169271A, a method is disclosed in which white light is realized by using a quantum dot (QD) emitting red light and green light as a fluorescent body between a blue LED and a light guide plate, and thus high brightness and an improvement in color reproducibility are realized. In SID'12 DIGEST p. 895, a method is proposed in which an optical conversion sheet using a quantum dot (QDEF, also referred to as a quantum dot sheet) is combined in order to enhance color reproducibility of the LCD.

SUMMARY OF THE INVENTION

In JP3448626B and JP1989-133003A (JP-H01-133003A) in which a light utilization rate is enhanced, a broadband optical recycling function is applied to the white light, and thus the design is complicated in consideration of a multilayer configuration and wavelength dispersion properties of the member, and manufacturing costs are high. In addition, in a fluorescent (PL) application technology disclosed in JP2012-169271A and SID'12 DIGEST p. 895, high brightness and an improvement in color reproducibility are realized according to the white light by using the Quantum Dot (hereinafter, also referred to as a QD), but it is necessary to be combined with JP3448626B and JP1989-133003A (JP-H01-133003A) in order to further enhance the brightness, and thus the same problems as described above occur.

The enhancement in a BL light utilization rate necessary for power saving and high definition (a decrease in an opening ratio) and an improvement in color reproducibility (a decrease in transmittance of a color filter (hereinafter, also referred to as a CF)) have a trade-off relationship, and it is necessary to make the enhancement in the light utilization rate and the color reproducibility compatible.

An object of the present invention is to provide an optical sheet member in which front brightness, front contrast, and a color reproducing region are all improved at the time of being incorporated in an image display device using RGB narrowband backlight.

In order to attain the object described above, as a result of intensive studies of the present inventors, it has been found that a light utilization rate is increased by using a reflection polarizer having a narrow reflection peak in an RGB wavelength region according to a light source using RGB bright line light (a half-value width of less than or equal to 100 nm, and for example, a quantum dot BL) having a narrow light emitting peak in an RGB wavelength region, and it is possible to concurrently increase front brightness, front contrast, and a color reproducing region with a simple configuration to the extent of not being known in the related art, and thus it has been found that the object described above is able to be attained.

That is, the object described above is attained by the present invention having the following configuration.

[1] An optical sheet member including a polarizing plate including a polarizer (A); a brightness enhancement film including a reflection polarizer (B); and a λ/4 plate (C), in which the reflection polarizer (B) includes a first light reflecting layer which has a reflection center wavelength in a wavelength range of 430 nm to 480 nm, has a peak of reflectivity having a half-value width of less than or equal to 100 nm, and is formed by fixing a cholesteric liquid crystalline phase emitting circular polarization light, a second light reflecting layer which has a reflection center wavelength in a wavelength range of 500 nm to 600 nm, has a peak of reflectivity having a half-value width of less than or equal to 100 nm, and is formed by fixing the cholesteric liquid crystalline phase emitting circular polarization light, and a third light reflecting layer which has a reflection center wavelength in a wavelength range of 600 nm to 650 nm, has a peak of reflectivity having a half-value width of less than or equal to 100 nm, and is formed by fixing the cholesteric liquid crystalline phase emitting circular polarization light, and the brightness enhancement film includes the λ/4 plate (C) satisfying Expression (2) described below between the polarizer (A) and the reflection polarizer (B).

550 nm/4−25 nm<Re(550)<550 nm/4+25 nm      Expression (2)

(In the expression, Re(λ) represents retardation (unit: nm) in an in-plane direction at a wavelength of λ nm.)

[2] In the optical sheet member according to [1], it is preferable that the λ/4 plate (C) further satisfies Expressions (1), (3), and (4) described below.

450 nm/4−25 nm<Re(450)<450 nm/4+25 nm      Expression (1)

630 nm/4−25 nm<Re(630)<630 nm/4+25 nm      Expression (3)

Re(450)<Re(550)<Re(630)      Expression (4)

(In the expression, Re(λ) represents retardation (unit: nm) in an in-plane direction at a wavelength of λ nm.)

[3] A optical sheet member including a polarizing plate including a polarizer (A); and a brightness enhancement film including a reflection polarizer (B), in which the reflection polarizer (B) is a dielectric multilayer film which has a reflection center wavelength in a wavelength range of 430 nm to 480 nm, a peak of reflectivity having a half-value width of less than or equal to 100 nm, a reflection center wavelength in a wavelength range of 500 nm to 600 nm, a peak of reflectivity having a half-value width of less than or equal to 100 nm, a reflection center wavelength in a wavelength range of 600 nm to 650 nm, and a peak of reflectivity having a half-value width of less than or equal to 100 nm, and emits linear polarization light.

[4] In the optical sheet member according to any one of [1] to [3], it is preferable that the polarizing plate and the reflection polarizer (B) are laminated in direct contact with each other or through an adhesive layer.

[5] In the optical sheet member according to [1] or [2], it is preferable that the polarizing plate, the λ/4 plate (C), and the reflection polarizer (B) are sequentially laminated in direct contact with each other or through an adhesive layer.

[6] In the optical sheet member according to any one of [1] to [5], it is preferable that a difference in a refractive indexes between the reflection polarizer (B) and a layer in direct contact with the reflection polarizer (B) on the polarizing plate side is less than or equal to 0.15.

[7] In the optical sheet member according to any one of [1] to [6], it is preferable that a film thickness of the brightness enhancement film is 5 m to 10 nm.

[8] An image display device including the optical sheet member according to any one of [1] to [7]; and a backlight unit, in which the backlight unit includes a light source emitting blue light which has a light emitting center wavelength in a wavelength range of 430 nm to 480 nm, and has a peak of light emitting intensity having a half-value width of less than or equal to 100 nm, green light which has a light emitting center wavelength in a wavelength range of 500 nm to 600 nm, and has a peak of light emitting intensity having a half-value width of less than or equal to 100 nm, and red light which has a light emitting center wavelength in a wavelength range of 600 nm to 650 nm, and has a peak of light emitting intensity having a half-value width of less than or equal to 100 nm, and the backlight unit includes a reflection member performing conversion of a polarization state of light which is emitted from the light source and is reflected on the optical sheet member and reflection of the light in a rear portion of the light source.

[9] In the image display device according to [8], it is preferable that the light source includes a blue light emitting diode emitting the blue light, and a fluorescent material emitting the green light and the red light when the blue light of the blue light emitting diode is incident thereon.

[10] In the image display device according to [9], it is preferable that the fluorescent material is a quantum dot member, and the quantum dot member is arranged between the optical sheet member and a blue light source.

[11] In the image display device according to [10], it is preferable that the quantum dot member emits fluorescent light holding at least a part of polarization properties of an incidence ray.

[12] In the image display device according to any one of [8] to [11], it is preferable that the image display device further includes a liquid crystal cell.

[13] In the image display device according to any one of [8] to [12], it is preferable that the backlight unit includes a wavelength selective filter for a blue color which selectively transmits light having a wavelength shorter than 460 nm among the blue light rays.

[14] In the image display device according to any one of [8] to [13], it is preferable that the backlight unit includes a wavelength selective filter for a red color which selectively transmits light having a wavelength longer than 630 nm among the red light rays.

[15] In the image display device according to any one of [8] to [14], it is preferable that the image display device further includes a thin layer transistor, and the thin layer transistor includes an oxide semiconductor layer having a carrier concentration of less than $1 \times 10^{14}/cm^3$.

According to the present invention, it is possible to provide an optical sheet member in which front brightness, front contrast, and a color reproducing region are all improved at the time of being incorporated in an image display device using RGB narrowband backlight.

BRIEF DESCRIPTION OF THE DRAWINGS

FIG. 1 is a schematic view illustrating a sectional surface of an example of an optical sheet member of the present invention using a layer formed by fixing cholesteric liquid crystalline phases of three layers as a reflection polarizer along with a positional relationship with respect to backlight.

FIG. 2 is a schematic view illustrating a sectional surface of another example of the optical sheet member of the present invention using the layer formed by fixing the cholesteric liquid crystalline phases of the three layers as the reflection polarizer along with the positional relationship with respect to the backlight.

FIG. 3 is a schematic view illustrating a sectional surface of still another example of the optical sheet member of the present invention using the layer formed by fixing the cholesteric liquid crystalline phases of the three layers as the reflection polarizer along with the positional relationship with respect to the backlight.

FIG. 4 is a schematic view of a sectional surface of an example of an optical sheet member of the present invention using a dielectric multilayer film as a reflection polarizer along with a positional relationship with respect to the backlight.

DESCRIPTION OF THE PREFERRED EMBODIMENTS

Figure 5:
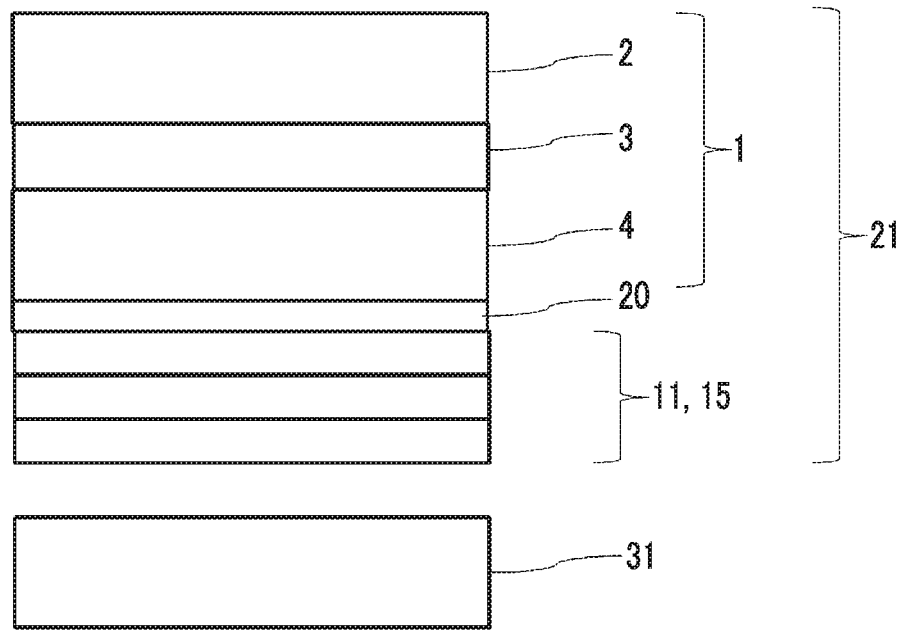
FIG. 5 is a schematic view of a sectional surface of another example of the optical sheet member of the present invention using the dielectric multilayer film as the reflection polarizer along with the positional relationship with respect to the backlight.

Hereinafter, an optical sheet member and an image display device of the present invention will be described in detail.

The following description of configuration requirement is based on a representative embodiment of the present invention, but the present invention is not limited to such an embodiment. Furthermore, herein, a numerical range denoted by using "to" indicates a range including numerical values described before and after "to" as a lower limit value and an upper limit value.

Herein, a "half-value width" of a peak indicates the width of a peak at a peak height of ½.

[Optical Sheet Member]

In an aspect of (i), an optical sheet member of the present invention includes a polarizing plate including a polarizer (A); a brightness enhancement film including a reflection polarizer (B); and a λ/4 plate (C), the reflection polarizer (B) includes a first light reflecting layer which has a reflection center wavelength in a wavelength range of 430 nm to 480 nm, has a peak of reflectivity having a half-value width of less than or equal to 100 nm, and is formed by fixing a cholesteric liquid crystalline phase emitting circular polarization light, a second light reflecting layer which has a reflection center wavelength in a wavelength range of 500 nm to 600 nm, has a peak of reflectivity having a half-value width of less than or equal to 100 nm, and is formed by fixing a cholesteric liquid crystalline phase emitting circular polarization light, and a third light reflecting layer which has a reflection center wavelength in a wavelength range of 600 nm to 650 nm, has a peak of reflectivity having a half-value width of less than or equal to 100 nm, and is formed by fixing a cholesteric liquid crystalline phase emitting circular polarization light, the brightness enhancement film includes a λ/4 plate (C) between the polarizer (A) and the reflection polarizer (B) in which Expression (2) described below is satisfied.

$$550\ nm/4 - 25\ nm < Re(550) < 550\ nm/4 + 25\ nm \qquad \text{Expression (2)}$$

(In the expression, $Re(\lambda)$ represents retardation (unit: nm) in an in-plane direction at a wavelength of $\lambda$ nm.)

In an aspect of (ii), an optical sheet member of the present invention includes a polarizing plate including a polarizer (A); and a brightness enhancement film including a reflection polarizer (B), the reflection polarizer (B) is a dielectric multilayer film which has a reflection center wavelength in a wavelength range of 430 nm to 480 nm, a peak of reflectivity having a half-value width of less than or equal to 100 nm, a reflection center wavelength in a wavelength range of 500 nm to 600 nm, a peak of reflectivity having a half-value width of less than or equal to 100 nm, a reflection center wavelength in a wavelength range of 600 nm to 650 nm, and a peak of reflectivity having a half-value width of less than or equal to 100 nm, and emits linear polarization light.

According to such a configuration, in the optical sheet member of the present invention, front brightness, front contrast, and a color reproducing region are all improved at the time of being incorporated in an image display device using RGB narrowband backlight.

In FIG. 1 to FIG. 6, a schematic view of the optical sheet member of the present invention is illustrated along with a backlight unit 31. An optical sheet member 21 of the present invention includes a polarizing plate 1 and a brightness enhancement film 11. The polarizing plate 1 and the brightness enhancement film 11 may be laminated through an adhesive layer 20 (refer to FIG. 1, FIG. 2, FIG. 4, and FIG. 5), or may be separately arranged (refer to FIG. 3 and FIG. 6).

<Polarizing Plate>

Next, a polarizing plate will be described.

In general, it is preferable that the polarizing plate of the optical sheet member of the present invention is formed of a polarizer (A) and two polarizing plate protective films (hereinafter, also referred to as a protective film) arranged on both sides thereof, as with a polarizing plate used in a liquid crystal display device. In the present invention, it is preferable that, among the two protective films, a retardation film is used as a protective film arranged on a liquid crystal cell side.

In FIG. 1 to FIG. 6, the polarizing plate 1 includes a polarizer 3. It is preferable that the polarizing plate 1 includes a retardation film 2 on the surface of the polarizer 3 on a visible side. The polarizing plate 1 may include a polarizing plate protective film 4 on the surface of the polarizer 3 on the backlight unit 31 side (refer to FIG. 2, FIG. 3, FIG. 5, and FIG. 6) or may not include the polarizing plate protective film 3 on the surface of the polarizer 2 on the backlight unit 31 side (refer to FIG. 1 and FIG. 4).

(Polarizer)

It is preferable that a polarizer in which iodine is adsorbed and aligned in a polymer film is used as the polarizer (A) described above. The polymer film described above is not particularly limited, and various films are able to be used as the polymer film. Examples of the polarizer include a polyvinyl alcohol-based film, a polyethylene terephthalate-based film, an ethylene and vinyl acetate copolymer-based film, or a partially saponified film thereof, and a hydrophilic polymer film such as a cellulose-based film, a polyene-based alignment film such as a substance of polyvinyl alcohol subjected to a dehydration treatment or a substance of polyvinyl chloride subjected to a dehydrochlorination treatment, and the like. Among them, a polyvinyl alcohol-based film having excellent dyeability of iodine is preferably used as the polarizer (A).

Polyvinyl alcohol or a derivative thereof is used as the material of the polyvinyl alcohol-based film. Examples of the derivative of the polyvinyl alcohol include polyvinyl formal, polyvinyl acetal, and the like, and a substance modified with olefin such as ethylene and propylene, an unsaturated carboxylic acid such as an acrylic acid, a methacrylic acid, and a crotonic acid and alkyl ester thereof, acryl amide, or the like.

A degree of polymerization of the polymer which is the material of the polymer film described above is generally in a range of 500 to 10,000, is preferably in a range of 1,000 to 6,000, and is more preferably in a range of 1,400 to 4,000. Further, in a case of a saponified film, a degree of saponification, for example, is preferably greater than or equal to 75 mol %, is more preferably greater than or equal to 98 mol %, and is even more preferably 98.3 mol % to 99.8 mol %, from a viewpoint of solubility with respect to water.

The polymer film (an unstretched film) described above is subjected to at least a monoaxially stretching treatment and an iodine dyeing treatment according to a normal method. Further, a boric acid treatment and a cleaning treatment are able to be performed. In addition, a polymer film (a stretched film) subjected to the treatments described above is subjected to a drying treatment according to a normal method, and thus the polarizer (A) is obtained.

A stretching method in the monoaxially stretching treatment is not particularly limited, and both of a wet stretching method and a dry stretching method are able to be adopted as the stretching method. Examples of stretching means of the dry stretching method include an inter-roll stretching method, a heating roll stretching method, a compression stretching method, and the like. The stretching is able to be performed in multiple steps. In the stretching means described above, the unstretched film is generally in a heated state. A stretching ratio of the stretched film is able to be suitably set according to the purpose, and the stretching ratio (the total stretching ratio) is approximately 2 times to 8 times, is preferably 3 times to 7 times, and is more preferably 3.5 times to 6.5 times.

The iodine dyeing treatment, for example, is performed by dipping the polymer film in an iodine solution containing iodine and potassium iodide. The iodine solution is generally an aqueous solution of iodine, and contains iodine and potassium iodide as a dissolution aid. An iodine concentration is approximately 0.01 mass % to 1 mass %, and is preferably 0.02 mass % to 0.5 mass %, and a potassium iodide concentration is approximately 0.01 mass % to 10 mass %, and is preferably 0.02 mass % to 8 mass %.

In the iodine dyeing treatment, the temperature of the iodine solution is generally approximately 20° C. to 50° C., and is preferably 25° C. to 40° C. A dipping time is generally in a range of approximately 10 seconds to 300 seconds, and is preferably in a range of 20 seconds to 240 seconds. In the iodine dyeing treatment, an iodine content and a potassium content in the polymer film are adjusted to be in the range described below by adjusting conditions such as the concentration of the iodine solution, and the dipping temperature and the dipping time of the polymer film with respect to the iodine solution. The iodine dyeing treatment may be performed before the monoaxially stretching treatment, during the monoaxially stretching treatment, or after the monoaxially stretching treatment.

The iodine content of the polarizer (A) described above, for example, is in a range of 2 mass % to 5 mass %, and is preferably in a range of 2 mass % to 4 mass %, in consideration of optical properties.

It is preferable that the polarizer (A) described above contains potassium. A potassium content is preferably in a range of 0.2 mass % to 0.9 mass %, and is more preferably in a range of 0.5 mass % to 0.8 mass %. The polarizer (A) contains the potassium, and thus it is possible to obtain a polarization film having a preferred composite modulus (Er) and a high polarization degree. The potassium is able to be contained, for example, by dipping the polymer film which is the forming material of the polarizer (A) in a solution containing potassium. The solution described above may also be used as a solution containing iodine.

A drying method of the related art such as natural drying, blast drying, and heating drying is able to be used as a drying treatment step. For example, in the heating drying, a heating temperature is approximately 20° C. to 80° C., and a drying time is approximately 1 minute to 10 minutes. In addition, in this drying treatment step, the stretching is able to be suitably performed.

The thickness of the polarizer (A) is not particularly limited, and is generally 5 μm to 300 μm, is preferably 10 μm to 200 μm, and is more preferably 20 μm to 100 μm.

As optical properties of the polarizer (A), single transmittance at the time of being measured in a single polarizer (A) is preferably greater than or equal to 43%, and is more preferably in a range of 43.3% to 45.0%. In addition, it is preferable that orthogonal transmittance measured by preparing two polarizers (A) and by superimposing the two polarizers (A) such that absorption axes of the two polarizers (A) mutually form 90° is smaller, in practical use, the orthogonal transmittance is preferably greater than or equal to 0.00% and less than or equal to 0.050%, and is more preferably less than or equal to 0.030%. The polarization degree, in practical use, is preferably greater than or equal to 99.90% and less than or equal to 100%, and is particularly preferably greater than or equal to 99.93% and less than or equal to 100%. A polarizer in which approximately the same optical properties are able to be obtained even at the time of being measured as a polarizing plate is preferable.

(Polarizing Plate Protective Film)

The optical sheet member of the present invention may or may not include a polarizing plate protective film on a side of the polarizer opposite to the liquid crystal cell. When the optical sheet member does not include the polarizing plate protective film on the side of the polarizer opposite to the liquid crystal cell, a reflection polarizer described below may be directly disposed on the polarizer or may be disposed through an adhesive agent.

Among the protective films described above, a thermoplastic resin having excellent transparency, mechanical strength, heat stability, moisture blocking properties, isotropy, and the like is used as the protective film arranged on the side opposite to the liquid crystal cell. Specific examples of such a thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth) acrylic resin, a cyclic polyolefin resin (a norbornene-based resin), a polyarylate resin, a polystyrene resin, a polyvinyl alcohol resin, and a mixture thereof.

The cellulose resin is ester of cellulose and a fatty acid. Specific examples of such a cellulose ester-based resin include triacetyl cellulose, diacetyl cellulose, tripropyl cellulose, dipropyl cellulose, and the like. Among them, the triacetyl cellulose is particularly preferable. Various products of the triacetyl cellulose have been commercially available, and the triacetyl cellulose is advantageous from a viewpoint of easiness in acquisition and cost. Examples of a commercially available product of the triacetyl cellulose include product names of "UV-50", "UV-80", "SH-80", "TD-80U", "TD-TAC", and "UZ-TAC" manufactured by Fujifilm Corporation, and a product name of "KC Series" manufactured by Konica Minolta, Inc., and the like.

A norbornene-based resin is preferable as a specific example of the cyclic polyolefin resin. The cyclic olefin-based resin is a general term of resins in which cyclic olefin is polymerized as a polymerization unit, and examples of the cyclic olefin-based resin include resins disclosed in JP1989-240517A (JP-H01-240517A), JP1991-14882A (JP-H03-14882A), JP1991-122137A (JP-H03-122137A), and the like. Specific examples of the cyclic olefin-based resin include a ring-opening (co)polymer of cyclic olefin, an addition polymer of cyclic olefin, α-olefin and a copolymer thereof such as cyclic olefin and ethylene, propylene, or the like (representatively, a random copolymer), a graft polymer in which these materials are modified with an unsaturated carboxylic acid or a derivative thereof, a hydride thereof, and the like. Specific examples of the cyclic olefin include a norbornene-based monomer.

Various products have been commercially available as the cyclic polyolefin resin. Specific examples of the cyclic polyolefin resin include product names of "Zeonex" and "Zeonor" manufactured by Zeon Corporation, a product name of "Arton" manufactured by JSR Corporation, a product name of "Topas" manufactured by Celanese Corporation, and a product name of "APEL" manufactured by Mitsui Chemicals, Inc.

An arbitrarily suitable (meth)acrylic resin is able to be adopted as the (meth)acrylic resin, within a range not impairing the effect of the present invention. Examples of the (meth)acrylic resin include poly(meth)acrylic ester such as polymethyl methacrylate, a methyl methacrylate-(meth) acrylic acid copolymer, a methyl methacrylate-(meth)acrylic ester copolymer, a methyl methacrylate-acrylic ester-(meth) acrylic acid copolymer, a methyl(meth)acrylate-styrene copolymer (an MS resin or the like), and a polymer having an alicyclic hydrocarbon group (for example, methyl methacrylate-cyclohexyl methacrylic acid copolymer, a methyl methacrylate-norbomyl(meth)acrylic acid copolymer, and the like). Preferably, examples of the (meth)acrylic resin include an C1-6 polyalkyl(meth)acrylate such as polymethyl (meth)acrylate. More preferably, examples of the (meth) acrylic resin include a methyl methacrylate-based resin in which methyl methacrylate is a main component (50 mass % to 100 mass %, and preferably 70 mass % to 100 mass %).

Specific examples of the (meth)acrylic resin include Acrypet VH and Acrypet VRL20A manufactured by Mitsubishi Rayon Co., Ltd., a (meth)acrylic resin having a ring structure in the molecule which is disclosed in JP2004-70296A, and a (meth)acrylic resin having high Tg obtained by a cross-linkage in the molecule or a cyclization reaction in the molecule.

A (meth)acrylic resin having a lactone ring structure is able to be used as the (meth)acrylic resin. This is because the (meth)acrylic resin has high heat resistance, high transparency, and high mechanical strength due to biaxial stretching.

The thickness of the protective film is able to be suitably set, and is generally approximately 1 μm to 500 μm from a viewpoint of workability such as strength or handling, thin layer properties, and the like. In particular, the thickness of the protective film is preferably 1 μm to 300 μm, and is more preferably 5 μm to 200 μm. It is particularly preferable that the thickness of the protective film is 5 μm to 150 μm.

$Re(\lambda)$ and $Rth(\lambda)$ respectively indicate in-plane retardation and retardation in a thickness direction at a wavelength of $\lambda$. $Re(\lambda)$ is measured by allowing light having a wavelength of $\lambda$ nm to be incident in a film normal direction using KOBRA 21ADH or WR (manufactured by Oji Scientific Instruments). In selection of a measurement wavelength of $\lambda$ nm, a wavelength selective filter is manually exchanged or a measurement value is converted by using a program or the like, and thus the measurement is able to be performed. When a film to be measured is denoted by monoaxial or biaxial refractive index ellipsoid, $Rth(h)$ is calculated by the following method. Furthermore, a part of this measurement method is used in measurement of an average tilt angle of a discotic liquid crystal molecule on an alignment film side in an optical anisotropic layer described below and an average tilt angle on a side opposite to the alignment film side.

In $Rth(\lambda)$, $Re(\lambda)$ described above is measured at total 6 points by allowing light having a wavelength of $\lambda$ nm to be incident from directions respectively inclined in 10° step from a normal direction to 50° on one side with respect to a film normal direction in which an in-plane slow axis (determined by KOBRA 21ADH or WR) is used as an inclination axis (a rotational axis) (when there is no slow axis, an arbitrary direction of a film plane is used as the rotational axis), and KOBRA 21ADH or WR is calculated on the basis of the measured retardation value, an assumed value of the average refractive index, and the input film thickness value. In the above description, in a case of a film having a direction in which a retardation value at a certain inclination angle is zero by using the in-plane slow axis as the rotational axis from the normal direction, a retardation value at an inclination angle greater than the inclination angle described above is changed to have a negative sign, and then KOBRA 21ADH or WR is calculated. Furthermore, a retardation value is measured from two arbitrarily inclined directions by using the slow axis as the inclination axis (the rotational axis) (when there is no slow axis, an arbitrary direction of the film plane is used as the rotational axis), and Rth is able to be calculated by Expression (A) and Expression (B) described below on the basis of the retardation value, an assumed value of the average refractive index, and the input film thickness value.

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad \text{Expression (A)}$$

Furthermore, $Re(\theta)$ described above indicates a retardation value in a direction inclined by an angle of $\theta$ from the normal direction. In addition, in Expression (A), nx represents a refractive index in the slow axis direction in the plane, ny represents a refractive index in a direction orthogonal to nx in the plane, and nz represents a refractive index in a direction orthogonal to nx and ny. d is a film thickness.

$$Rth=((nx+ny)/2-nz)\times d \qquad \text{Expression (B)}$$

When the measured film is a so-called film not having an optic axis which is not able to be denoted by a monoaxial or biaxial refractive index ellipsoid, Rth(λ) is calculated by the following method. In Rth(λ), Re(λ) described above is measured at 11 points by allowing light having a wavelength of λ nm to be incident from directions respectively inclined in 10° step from −50° to +50° with respect to the film normal direction in which the in-plane slow axis (determined by KOBRA 21ADH or WR) is used as the inclination axis (the rotational axis), and KOBRA 21ADH or WR is calculated on the basis of the measured retardation value, an assumed value of the average refractive index, and the input film thickness value. In addition, in the measurement described above, a catalog value of various optical films in a polymer handbook (JOHN WILEY & SONS, INC) is able to be used as the assumed value of the average refractive index. When the value of the average refractive index is not known in advance, the value of the average refractive index is able to be measured by using an Abbe's refractometer. The value of the average refractive index of a main optical film will be exemplified as follows: cellulose acylate (1.48), a cycloolefin polymer (1.52), polycarbonate (1.59), polymethyl methacrylate (1.49), and polystyrene (1.59). The assumed values of the average refractive index and the film thickness are input, and thus nx, ny, and nz are calculated by KOBRA 21ADH or WR. Nz=(nx−nz)/(nx−ny) is further calculated by the calculated nx, ny, and nz.

Furthermore, herein, "visible light" indicates light at 380 nm to 780 nm. In addition, herein, the measurement wavelength is 550 nm unless otherwise specified.

In addition, herein, angles (for example, angles such as "90°") and a relationship thereof (for example, "orthogonal", "parallel", and "intersecting at 45°", and the like) are in a range of an error which is allowable in a technical field of the present invention. For example, the angle indicates that the angle is in a range of less than ±10° from an exact angle, and an error from the exact angle is preferably less than or equal to 5°, and is more preferably less than or equal to 3°.

Herein, the "slow axis" of the retardation film or the like indicates a direction in which the refractive index is maximized.

In addition, herein, a numerical value, a numerical range, and quantitative expression (for example, the expression such as "equal" and "identical") indicating optical properties of each member such as a phase difference region, a retardation film, and a liquid crystal layer are interpreted as a numerical value, a numerical range, and properties including an error which is generally allowable in a liquid crystal display device or members used therein.

In addition, herein, a "front surface" indicates the normal direction with respect to a display surface, and "front contrast (CR)" indicates contrast calculated from white brightness and black brightness which are measured in the normal direction of the display surface, and "view angle contrast (CR)" indicates contrast calculated from white brightness and black brightness which are measured in a direction inclined from the normal direction of the display surface (for example, a direction defined by 60° in a polar angle direction with respect to the display surface).

(Adhesive Layer)

In order to bond the polarizer (A) to the protective film, an adhesive agent, and the like are able to be suitably adopted according to the polarizer (A) and the protective film. This adhesive agent and an adhesion treatment method are not particularly limited, and for example, the adhesion treatment method is able to be performed through an adhesive agent formed of a vinyl polymer, an adhesive agent formed of a water-soluble cross-linking agent of a vinyl alcohol-based polymer such as at least a boric acid or borax, glutaraldehyde or melamine, and an oxalic acid. The adhesive layer formed of such an adhesive agent is able to be formed as a coated and dried layer of an aqueous solution, and when this aqueous solution is prepared, as necessary, a cross-linking agent or other additives, and a catalyst such as an acid are able to be mixed. In particular, when a polyvinyl alcohol-based polymer film is used as the polarizer (A), it is preferable that an adhesive agent containing a polyvinyl alcohol-based resin is used from a viewpoint of adhesiveness. Further, it is more preferable that an adhesive agent containing a polyvinyl alcohol-based resin having an acetoacetyl group is used from a viewpoint of improving durability.

The polyvinyl alcohol-based resin described above is not particularly limited, and the average degree of polymerization is approximately 100 to 3,000, and the average degree of saponification is preferably 85 mol % to 100 mol %, from a viewpoint of adhesiveness. In addition, the concentration of the adhesive agent aqueous solution is not particularly limited, and the concentration of the adhesive agent aqueous solution is preferably 0.1 mass % to 15 mass %, and is more preferably 0.5 mass % to 10 mass %. The thickness of the adhesive layer described above is preferably approximately 30 nm to 1,000 nm, and is more preferably 50 nm to 300 nm, in the thickness after drying. When the thickness is excessively thin, an adhesion force becomes insufficient, and when the thickness is excessively thick, a problem is more likely to occur in the appearance.

An ultraviolet curable resin or a thermosetting resin such as a (meth)acrylic resin, an urethane-based resin, an acryl urethane-based resin, an epoxy-based resin, and a silicone-based resin is able to be used as the other adhesive agent.

<Brightness Enhancement Film>

The brightness enhancement film includes the reflection polarizer (B), and the brightness enhancement film has a reflection center wavelength in a wavelength range of 430 nm to 480 nm, a peak of reflectivity having a half-value width of less than or equal to 100 nm, a reflection center wavelength in a wavelength range of 500 nm to 600 nm, a peak of reflectivity having a half-value width of less than or equal to 100 nm, a reflection center wavelength in a wavelength range of 600 nm to 650 nm, and a peak of reflectivity having a half-value width of less than or equal to 100 nm.

According to the brightness enhancement film having such a configuration, light in a first polarization state is able to be substantially reflected by a reflection polarizer, and light in a second polarization state is able to be substantially transmitted through the reflection polarizer, and the light in the first polarization state which is substantially reflected by the reflection polarizer is recirculated in a random direction and a polarization state by a reflection member described below (such as a light guide device and an optical resonator), and thus brightness of an image display device is able to be improved.

Light emitted from the reflection polarizer (B), that is, the polarization state of transmission light and reflection light of the reflection polarizer, for example, is able to be measured by measuring the polarization using Axoscan manufactured by Axometrics Inc.

In the optical sheet member of the present invention, the film thickness of the brightness enhancement film is preferably 3 μm to 12 μm, is more preferably 5 μm to 10 μm, and is particularly preferably 6 μm to 9 μm.

The following aspect (i) or (ii) is preferable as the brightness enhancement film described above.

Aspect (i): The reflection polarizer (B) includes the first light reflecting layer which has a reflection center wavelength in a wavelength range of 430 nm to 480 nm, has a peak of reflectivity having a half-value width of less than or equal to 100 nm, and is formed by fixing a cholesteric liquid crystalline phase emitting circular polarization light, the second light reflecting layer which has a reflection center wavelength in a wavelength range of 500 nm to 600 nm, has a peak of reflectivity having a half-value width of less than or equal to 100 nm, and is formed by fixing a cholesteric liquid crystalline phase emitting circular polarization light, and the third light reflecting layer which has a reflection center wavelength in a wavelength range of 600 nm to 650 nm, has a peak of reflectivity having a half-value width of less than or equal to 100 nm, and is formed by fixing a cholesteric liquid crystalline phase emitting circular polarization light, and the brightness enhancement film includes λ/4 plate (C) between the polarizer (A) and the reflection polarizer (B) in which Expression (2) described below is satisfied. It is preferable that, in the λ/4 plate (C) described above, Expressions (1), (3), and (4) are further satisfied.

$$450 \text{ nm}/4-25 \text{ nm} < Re(450) < 450 \text{ nm}/4+25 \text{ nm} \quad \text{Expression (1)}$$

$$550 \text{ nm}/4-25 \text{ nm} < Re(550) < 550 \text{ nm}/4+25 \text{ nm} \quad \text{Expression (2)}$$

$$630 \text{ nm}/4-25 \text{ nm} < Re(630) < 630 \text{ nm}/4+25 \text{ nm} \quad \text{Expression (3)}$$

$$Re(450) < Re(550) < Re(630) \quad \text{Expression (4)}$$

(In Expressions (1) to (4), $Re(\lambda)$ represents retardation (unit: nm) in the in-plane direction at a wavelength of λ nm.)

Aspect (ii): The reflection polarizer (B) is a dielectric multilayer film which has a reflection center wavelength in a wavelength range of 430 nm to 480 nm, a peak of reflectivity having a half-value width of less than or equal to 100 nm, a reflection center wavelength in a wavelength range of 500 nm to 600 nm, a peak of reflectivity having a half-value width of less than or equal to 100 nm, a reflection center wavelength in a wavelength range of 600 nm to 650 nm, and a peak of reflectivity having a half-value width of less than or equal to 100 nm, and emits linear polarization light.

Figure 6:
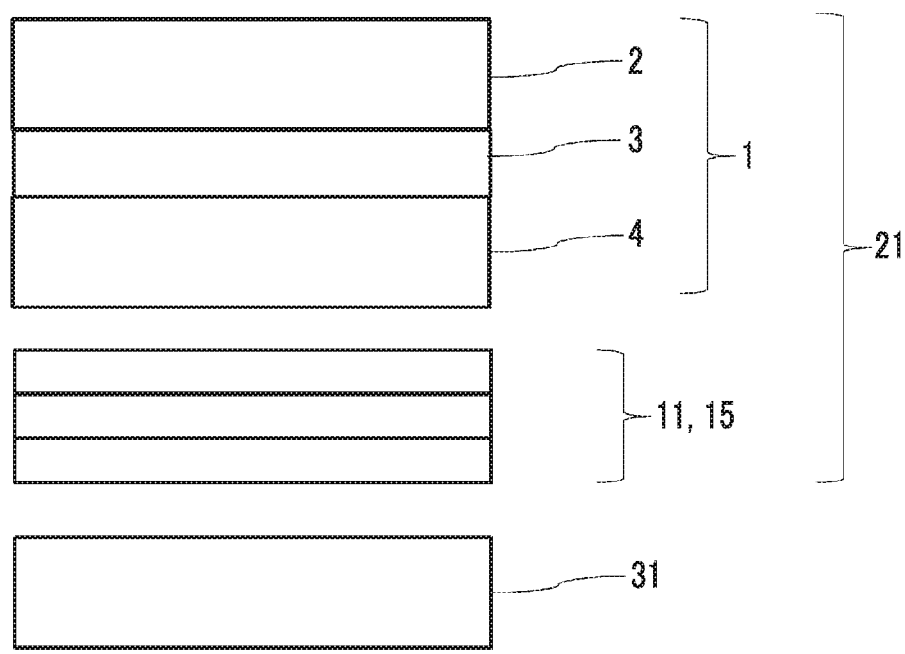
FIG. 6 is a schematic view of a sectional surface of still another example of the optical sheet member of the present invention using the dielectric multilayer film as the reflection polarizer along with the positional relationship with respect to the backlight.

In FIG. 1 to FIG. 6, a specific example of the aspect (i) is illustrated in FIG. 1 to FIG. 3, and a specific example of the aspect (ii) is illustrated in FIG. 4 to FIG. 6.

First, the aspect (i) will be described.

The light reflecting layer formed by fixing a cholesteric liquid crystalline phase is able to reflect at least one of right circular polarization light and left circular polarization light in a wavelength range in the vicinity of the reflection center wavelength. In addition, the λ/4 plate is able to convert the light having a wavelength of λ nm into linear polarization light from circular polarization light. According to the brightness enhancement film having a configuration as in the aspect (i), the light in the first polarization state (for example, the right circular polarization light) is substantially reflected by the reflection polarizer, and the light in the second polarization state (for example, the left circular polarization light) is substantially transmitted through the reflection polarizer described above, and the light in the second polarization state (for example, the left circular polarization light) which is transmitted through the reflection polarizer described above is converted into the linear polarization light by the λ/4 plate (C) in which Expression (2), and preferably Expressions (1) to (4), is satisfied, and thus the light is able to be substantially transmitted through the polarizer (a linear polarizer) of the polarizing plate described above.

In the aspect (i), it is preferable that the reflection polarizer (B) described above includes the first light reflecting layer described above, the second light reflecting layer described above, and the third light reflecting layer described above. From a viewpoint of thinning the film thickness of the brightness enhancement film, it is preferable that the reflection polarizer (B) described above includes only the first light reflecting layer described above, the second light reflecting layer described above, and the third light reflecting layer described above as the layer formed by fixing the cholesteric liquid crystalline phase, that is, it is preferable that the reflection polarizer (B) described above does not include a layer formed by fixing the other cholesteric liquid crystalline phase.

In FIG. 1 to FIG. 3, an aspect is illustrated in which three layers of a first light reflecting layer 14a formed by fixing a cholesteric liquid crystalline phase, a second light reflecting layer 14b formed by fixing a cholesteric liquid crystalline phase, and a third light reflecting layer 14c formed by fixing a cholesteric liquid crystalline phase are laminated on a λ/4 plate 12 in which Expression (2), preferably Expressions (1) to (4), is satisfied through the adhesive layer 20. However, the present invention is not limited to such a specific example, and the first light reflecting layer described above, the second light reflecting layer described above, and the third light reflecting layer described above may be in direct contact with the λ/4 plate in which Expression (2), preferably Expressions (1) to (4), is satisfied. In addition, the λ/4 plate 12 in which Expression (2), preferably Expressions (1) to (4), is satisfied may be a single layer, or may be a laminated body of two or more layers, and it is preferable that the λ/4 plate 12 is a laminated body of two or more layers.

The first light reflecting layer has a reflection center wavelength in a wavelength range of 430 nm to 480 nm, and has a peak of reflectivity having a half-value width of less than or equal to 100 nm.

It is preferable that the reflection center wavelength of the first light reflecting layer is in a wavelength range of 430 nm to 470 nm.

The half-value width of the peak of the reflectivity of the first light reflecting layer is preferably less than or equal to 100 nm, is more preferably less than or equal to 80 nm, and is particularly preferably less than or equal to 70 nm.

The second light reflecting layer has a reflection center wavelength in a wavelength range of 500 nm to 600 nm, and has a peak of reflectivity having a half-value width of less than or equal to 100 nm.

It is preferable that the reflection center wavelength of the second light reflecting layer is in a wavelength range of 520 nm to 560 nm.

The half-value width of the peak of the reflectivity of the second light reflecting layer is preferably less than or equal to 100 nm, is more preferably less than or equal to 80 nm, and is particularly preferably less than or equal to 70 nm.

The third light reflecting layer has a reflection center wavelength in a wavelength range of 600 nm to 650 nm, and has a peak of reflectivity having a half-value width of less than or equal to 100 nm.

It is preferable that the reflection center wavelength of the third light reflecting layer is in a wavelength range of 610 nm to 640 nm.

The half-value width of the peak of the reflectivity of the third light reflecting layer is preferably less than or equal to 100 nm, is more preferably less than or equal to 80 nm, and is particularly preferably less than or equal to 70 nm.

The wavelength applying a peak (that is, the reflection center wavelength) is able to be adjusted by changing the pitch or the refractive index of the cholesteric liquid crystal layer, and the pitch is able to be easily changed by changing an added amount of a chiral agent. Specifically, the details are described in Fuji Film Research & Development No. 50 (2005) pp. 60-63.

A lamination sequence of the first light reflecting layer, the second light reflecting layer, and the third light reflecting layer will be described. In any sequence, front brightness is able to be improved. However, in an inclined azimuth, coloring occurs due to the influence of the first light reflecting layer, the second light reflecting layer, and the third light reflecting layer. This is due to the following two reasons. One reason is that, in the inclined azimuth, the peak wavelength of the reflectivity of the light reflecting layer is shifted to a short wave side with respect to the peak wavelength of the front surface. For example, in the light reflecting layer having a reflection center wavelength in a wavelength range of 500 nm to 600 nm, the center wavelength is shifted in the wavelength range of 400 nm to 500 nm in the inclined azimuth. The other reason is that the light reflecting layer functions as a negative C plate (in Rth, a positive phase difference plate) in a wavelength region where the reflection does not occur, and thus the coloring occurs due to the influence of the retardation in the inclined azimuth. The present inventors have specifically studied the reason of the coloring in the configuration of the present invention, and as a result thereof, it has been found that there is an arrangement sequence which is most preferable to suppress the coloring depending on the lamination sequence of the first light reflecting layer, the second light reflecting layer, and third light reflecting layer. That is, it is most preferable that the first light reflecting layer having the smallest wavelength (a Blue layer: B) is positioned on the light source side, the third light reflecting layer having the largest wavelength (a Red layer: R) is positioned, and then the second light reflecting layer having the intermediate wavelength (a Green layer: G) is positioned, when seen from the backlight unit (the light source) side. That is, BRG (the first light reflecting layer, the third light reflecting layer, and the second light reflecting layer) are sequentially formed from the backlight unit (the light source) side.

The lamination sequence of the first light reflecting layer, the second light reflecting layer, and the third light reflecting layer is any one of the arrangement sequences of BRG (the first light reflecting layer, the third light reflecting layer, and the second light reflecting layer), BGR (the first light reflecting layer, the second light reflecting layer, and the third light reflecting layer), GBR (the second light reflecting layer, the first light reflecting layer, and the third light reflecting layer), GRB (the second light reflecting layer, the third light reflecting layer, and the first light reflecting layer), RBG (the third light reflecting layer, the first light reflecting layer, and the second light reflecting layer), and RGB (the third light reflecting layer, the second light reflecting layer, and the first light reflecting layer) which are sequentially formed from the backlight unit side;

is preferably the arrangement sequence of BRG (the first light reflecting layer, the third light reflecting layer, and the second light reflecting layer), BGR (the first light reflecting layer, the second light reflecting layer, and the third light reflecting layer), or GBR (the second light reflecting layer, the first light reflecting layer, and the third light reflecting layer) which are sequentially formed from the backlight unit side; and is more preferably the arrangement sequence of BRG (the first light reflecting layer, the third light reflecting layer, and the second light reflecting layer) which are sequentially formed from the backlight unit side.

A manufacturing method of the light reflecting layer formed by fixing the cholesteric liquid crystalline phase which is used in the aspect (i) is not particularly limited, and for example, methods disclosed in JP1989-133003A (JP-H01-133003A), JP3416302B, JP3363565B, and JP1996-271731A (JP-H08-271731A) are able to be used as the manufacturing method of the light reflecting layer, and the contents of these publications are incorporated in the present invention.

Hereinafter, a method disclosed in JP1996-271731A (JP-H08-271731A) will be described.

When the cholesteric liquid crystal layer described above is superimposed, it is preferable that a combination in which the circular polarization light in the same direction is reflected is used. Accordingly, it is possible to prevent a phase state of the circular polarization light which is reflected on each layer from being aligned in a different polarization state in each wavelength region, and thus it is possible to increase utilization efficiency of light.

A suitable cholesteric liquid crystal may be used as the cholesteric liquid crystal, and the cholesteric liquid crystal is not particularly limited. It is preferable that a liquid crystal polymer is used from a viewpoint of superimposition efficiency and thinning of the liquid crystal layer. In addition, it is preferable that a wavelength region of selective reflection is widened as birefringence of a cholesteric liquid crystal molecule becomes larger.

A suitable liquid crystal polymer, for example, a main chain type liquid crystal polymer such as polyester, a side chain type liquid crystal polymer formed of an acrylic main chain or a methacrylic main chain, a siloxane main chain, and the like, a nematic liquid crystal polymer containing a low molecular chiral agent, a liquid crystal polymer introduced with a chiral component, a nematic-based and cholesteric-based mixed liquid crystal polymer, and the like are used as the liquid crystal polymer described above. It is preferable that a glass transition temperature is 30° C. to 150° C. from a viewpoint of handleability.

The cholesteric liquid crystal layer is able to be formed by using a suitable method such as a method of directly coating a polarization separating plate through a suitable alignment film such as an oblique vapor deposition layer of polyimide or polyvinyl alcohol, and SiO, as necessary, a method of coating a support body which does not deteriorate at an alignment temperature of a liquid crystal polymer formed of a transparent film or the like through an alignment film, as necessary. A support body having a phase difference as small as possible is preferably used as the support body from a viewpoint of preventing a change in a polarization state. In addition, a superimposition method of the cholesteric liquid crystal layer through the alignment film, and the like are able to be adopted.

Furthermore, the liquid crystal polymer is able to be coated with a liquid material such as a solution of a solvent or a melting liquid due to heating by using a suitable method such as a roll coating method or a gravure printing method, and a spin coating method. It is preferable that the thickness of the cholesteric liquid crystal layer to be formed is 0.5 μm to 100 μm from a viewpoint of selective reflection properties and of preventing alignment disorder or a decrease in transmittance.

The λ/4 plate (C) is a layer for converting the circular polarization light passing through the reflection layer into the linear polarization light. Simultaneously, the retardation (Rth) in the thickness direction is adjusted, and thus a phase difference which occurs when seen from the inclined azimuth in a positive thickness direction is able to be cancelled.

Accordingly, it is preferable that the retardation (Rth) in the thickness direction of the λ/4 plate (C) is a value close to 0, and it is more preferable that the retardation (Rth) in the thickness direction of the λ/4 plate (C) has a negative value. A preferred Rth value is different according to a layer sequence of the light reflecting layer. As described above, this is because the light reflecting layer functions as a negative C plate in the wavelength region where the reflection does not occur, that is, as a phase difference plate of positive Rth, and thus the sequence of the light reflecting layer directly affects a wavelength applying preferred retardation. A preferred range of Rth of the λ/4 plate (C) is as shown in Table 1 according to the arrangement sequence of the first light reflecting layer, the second light reflecting layer, and the third light reflecting layer.

TABLE 1

| Arrangement Sequences of Light Reflecting Layer from Backlight Unit Side | Preferred Range of Rth of λ/4 Plate (nm) |
|---|---|
| BRG (First Light Reflecting Layer, Third Light Reflecting Layer, and Second Light Reflecting Layer) | −400~−50 |
| BGR (First Light Reflecting Layer, Second Light Reflecting Layer, and Third Light Reflecting Layer) | −450~−80 |
| GRB (Second Light Reflecting Layer, Third Light Reflecting Layer, and First Light Reflecting Layer) | −650~−230 |
| GBR (Second Light Reflecting Layer, First Light Reflecting Layer, and Third Light Reflecting Layer) | −450~−310 |
| RBG (Third Light Reflecting Layer, First Light Reflecting Layer, and Second Light Reflecting Layer) | −360~−250 |
| RGB (Third Light Reflecting Layer, Second Light Reflecting Layer, and First Light Reflecting Layer) | −520~−280 |

In the aspect (i), the brightness enhancement film includes the λ/4 plate (C) between the polarizer (A) and the reflection polarizer (B) in which Expressions (1) to (4) described below are satisfied.

$$450 \text{ nm}/4-25 \text{ nm} < Re(450) < 450 \text{ nm}/4+25 \text{ nm} \quad \text{Expression (1)}$$

$$550 \text{ nm}/4-25 \text{ nm} < Re(550) < 550 \text{ nm}/4+25 \text{ nm} \quad \text{Expression (2)}$$

$$630 \text{ nm}/4-25 \text{ nm} < Re(630) < 630 \text{ nm}/4+25 \text{ nm} \quad \text{Expression (3)}$$

$$Re(450) < Re(550) < Re(630) \quad \text{Expression (4)}$$

(In Expressions (1) to (4), $Re(\lambda)$ represents retardation (unit: nm) in the in-plane direction at a wavelength of λ nm.)

It is preferable that, in the λ/4 plate (C) described above, Expressions (1') to (4') described below are satisfied.

$$450 \text{ nm}/4-15 \text{ nm} < Re(450) < 450 \text{ nm}/4+15 \text{ nm} \quad \text{Expression (1')}$$

$$550 \text{ nm}/4-15 \text{ nm} < Re(550) < 550 \text{ nm}/4+15 \text{ nm} \quad \text{Expression (2')}$$

$$630 \text{ nm}/4-15 \text{ nm} < Re(630) < 630 \text{ nm}/4+15 \text{ nm} \quad \text{Expression (3')}$$

$$Re(450) < Re(550) < Re(630) \quad \text{Expression (4')}$$

It is particularly preferable that, in the λ/4 plate (C) described above, Expressions (1") to (4") are satisfied.

$$450 \text{ nm}/4-5 \text{ nm} < Re(450) < 450 \text{ nm}/4+5 \text{ nm} \quad \text{Expression (1")}$$

$$550 \text{ nm}/4-5 \text{ nm} < Re(550) < 550 \text{ nm}/4+5 \text{ nm} \quad \text{Expression (2")}$$

$$630 \text{ nm}/4-5 \text{ nm} < Re(630) < 630 \text{ nm}/4+5 \text{ nm} \quad \text{Expression (3")}$$

$$Re(450) < Re(550) < Re(630) \quad \text{Expression (4")}$$

A manufacturing method of the λ/4 plate (C) used in the aspect (i) in which Expressions (1) to (4) are satisfied is not particularly limited, and for example, a method disclosed in JP1996-271731A (JP-H08-271731A) is able to be used as the manufacturing method of the λ/4 plate (C), and the contents of the publication are incorporated in the present invention.

Hereinafter, a method disclosed in JP1996-271731A (JP-H08-271731A) will be described.

Examples of a ¼ wavelength plate formed of a superimposed body of the retardation film include a ¼ wavelength plate formed by combining a retardation film applying a phase difference of a ½ wavelength with respect to monochromatic light and a retardation film applying a phase difference of a ¼ wavelength with respect to monochromatic light, and by laminating the retardation films such that optical axes of a plurality of retardation films intersect with each other.

In such a case, the plurality of retardation films applying the phase difference of the ½ wavelength or the ¼ wavelength with respect to the monochromatic light are laminated such that the optical axes intersect with each other, and thus a wavelength dispersion of retardation which is defined by the product (Δnd) of a refractive index difference (Δn) and a thickness (d) of birefringence light is able to be superimposed or adjusted, and is able to be arbitrarily controlled, the wavelength dispersion is suppressed while controlling the entire phase difference to the ¼ wavelength, and thus a wavelength plate indicating a phase difference of a ¼ wavelength over a wide wavelength region is able to be obtained.

In the above description, the number of laminations of the retardation film is an arbitrary number. Two to five retardation films are generally laminated from a viewpoint of transmittance of light or the like. In addition, the arrangement position of the retardation film applying the phase difference of the ½ wavelength and the retardation film applying the phase difference of the ¼ wavelength is also arbitrary.

In addition, when retardation of light having a wavelength of 450 nm is set to $R_{450}$, and retardation of light having a wavelength of 550 nm is set to $R_{550}$, the ¼ wavelength plate formed of the superimposed body of the retardation film is able to be obtained by laminating a retardation film having large retardation in which $R_{450}/R_{550}$ is 1.00 to 1.05 and a retardation film having small retardation in which $R_{450}/R_{550}$ is 1.05 to 1.20 such that the optical axes thereof intersect with each other.

In such a case, the retardation films having different retardations are laminated such that the optical axes intersect with each other, in particular, are orthogonal to each other, and thus the wavelength dispersion of the retardation of each of the retardation films is able to be superimposed or adjusted, and is able to be controlled, and in particular, the retardation is able to be reduced towards a short wavelength side.

In addition, specific examples of the ¼ wavelength plate described above include a ¼ wavelength plate which is formed by laminating a retardation film (retardation of light having a wavelength of 550 nm:700 nm) formed by performing a stretching treatment with respect to a polyvinyl alcohol film and a retardation film (retardation of light having a wavelength of 550 nm:560 nm) formed by performing a stretching treatment with respect to a polycarbonate film such that the optical axes thereof are orthogonal to each other. Such a lamination approximately functions as the ¼ wavelength plate over a wavelength of 450 nm to 650 nm.

The retardation film is able to be obtained, for example, by using a method of performing a monoaxial or biaxial stretching treatment with respect to a polymer film as described above. The type of the polymer is not particularly limited, and a polymer having excellent transparency is preferably used as the polymer. Examples of the polymer include a polycarbonate-based polymer, a polyester-based polymer, a polysulfone-based polymer, a polyether sulfone-based polymer, a polystyrene-based polymer, a polyolefin-based polymer, a polyvinyl alcohol-based polymer, a cellulose acetate-based polymer, a polyvinyl chloride-based polymer, a polymethyl methacrylate-based polymer, and the like.

In particular, the retardation film in which $R_{450}/R_{550}$ is 1.00 to 1.05, for example, is able to be formed by using a polymer of which an absorption end is in the vicinity of a wavelength of 200 nm, such as a polyolefin-based polymer, a polyvinyl alcohol-based polymer, a cellulose acetate-based polymer, a polyvinyl chloride-based polymer, and a polymethyl methacrylate-based polymer.

In addition, the retardation film in which $R_{450}/R_{550}$ is 1.05 to 1.20, for example, is able to be formed by using a polymer of which absorption end is on a long wavelength side from 200 nm, such as a polycarbonate-based polymer, a polyester-based polymer, a polysulfone-based polymer, a polyether sulfone-based polymer, and a polystyrene-based polymer.

On the other hand, a λ/4 plate (C) prepared as a laminated body of the following λ/2 plate and λ/4 plate is also able to be used as the λ/4 plate (C) used in the aspect (i) in which Expressions (1) to (4) are satisfied.

An optical anisotropic layer used as the λ/2 plate and the λ/4 plate described above will be described. The retardation film of the present invention may include an optical anisotropic layer, the optical anisotropic layer is able to be formed of one type or a plurality of types of curable compositions containing a liquid crystal compound as a main component, a liquid crystal compound having a polymerizable group is preferable among the liquid crystal compounds, and it is preferable that the optical anisotropic layer is formed of one type of the curable compositions described above.

The λ/4 plate used in the λ/4 plate (C) in which Expressions (1) to (4) are satisfied may be an optical anisotropic support body having a desired λ/4 function in the support body itself, or may include the optical anisotropic layer or the like on the support body formed of the polymer film. That is, in the latter case, the other layer is laminated on the support body, and thus a desired λ/4 function is obtained. The configuration material of the optical anisotropic layer is not particularly limited, and the optical anisotropic layer may be a layer which is formed of a composition containing a liquid crystal compound and has optical anisotropy expressed by aligning molecules of the liquid crystal compound, may be a layer which has optical anisotropy expressed by stretching the polymer film and by aligning the polymer in the film, or may include both of the layers. That is, the optical anisotropic layer is able to be configured of one or two or more biaxial films, and is able to be configured by a combination of two or more monoaxial films such as a combination of a C plate and an A plate. Naturally, the optical anisotropic layer is also able to be configured by combining one or more biaxial films and one or more monoaxial films.

Here, the "λ/4 plate" used in the λ/4 plate (C) in which Expressions (1) to (4) are satisfied indicates an optical anisotropic layer in which in-plane retardation Re(λ) at a specific wavelength of λ nm satisfies Re(λ)=λ/4.

The above expression may be attained at any wavelength (for example, 550 nm) in a visible light region, and in-plane retardation Re(550) at a wavelength of 550 nm is preferably 115 nm≤Re(550)≤155 nm, and is more preferably 120 nm to 145 nm. According to this range, when the λ/4 plate is combined with the following λ/2 plate, it is possible to reduce light leakage of reflection light to the extent of being invisible, and thus setting the retardation to be in this range is preferable.

The λ/2 plate used in the in the λ/4 plate (C) in which Expressions (1) to (4) are satisfied may be an optical anisotropic support body having a desired λ/2 function in the support body itself, or may include the optical anisotropic layer or the like on the support body of the polymer film. That is, in the latter case, the other layer is laminated on the support body, and thus a desired λ/2 function is obtained. The configuration material of the optical anisotropic layer is not particularly limited, and the optical anisotropic layer may be a layer which is formed of a composition containing a liquid crystal compound and has optical anisotropy expressed by aligning molecules of the liquid crystal compound, may be a layer which has optical anisotropy expressed by stretching the polymer film and by aligning the polymer in the film, or may include both of the layers. That is, the optical anisotropic layer is able to be configured of one or two or more biaxial films, and is able to be configured by a combination of two or more monoaxial films such as a combination of a C plate and an A plate. Naturally, the optical anisotropic layer is also able to be configured by combining one or more biaxial films and one or more monoaxial films.

Here, the "λ/2 plate" used in the λ/4 plate (C) in which Expressions (1) to (4) are satisfied indicates an optical anisotropic layer in which in-plane retardation Re(λ) at a specific wavelength of λ nm satisfies Re(λ)=λ/2.

The above expression may be attained at any wavelength (for example, 550 nm) in a visible light region. Further, in the present invention, in-plane retardation Re1 of the λ/2 plate is set to be substantially two times in-plane retardation Re2 of the λ/4 plate.

Here, the expression "the retardation is substantially two times" indicates Re1=2×Re2±50 nm.

Here, Re1=2×Re2±20 nm is preferable, and Re1=2×Re2±10 nm is more preferable. The above expression may be attained in any wavelength in the visible light region, and is preferably attained at a wavelength of 550 nm. According to this range, when the λ/2 plate is combined with the λ/4 plate described above, it is possible to reduce the light leakage of the reflection light to the extent of being invisible, and thus setting the retardation to be in this range is preferable.

The λ/4 plate (C) is laminated such that the direction of the linear polarization light which is transmitted through the λ/4 plate (C) is parallel to a transmission axis direction of the backlight side polarizing plate.

When the λ/4 plate (C) is a single layer, an angle between the slow axis direction of the λ/4 plate (C) and the absorption axis direction of the polarizing plate is 45°.

When the λ/4 plate (C) is a laminated body of the λ/4 plate and the λ/2 plate, an angle between the respective slow axis directions and the absorption axis direction of the polarizing plate has the following positional relationship.

When Rth of the λ/2 plate described above at a wavelength of 550 nm has a negative value, an angle between the slow axis direction of the λ/2 plate and the absorption axis direction of the polarizer layer described above is preferably in a range of 75°±8°, is more preferably in a range of 75°±6°, and is even more preferably in a range of 75°±3°. Further, in this case, an angle between the slow axis direction of the λ/4 plate described above and the absorption axis direction of the polarizer layer described above is preferably in a range of 15°±8°, is more preferably in a range of 15°±6°, and is even more preferably in a range of 15°±3°. According to the range described above, it is possible to reduce the light leakage of reflection light to the extent of being invisible, and thus setting the angle to be in this range is preferable.

In addition, when Rth of the λ/2 plate described above at a wavelength of 550 nm has a positive value, an angle between the slow axis direction of the λ/2 plate and the absorption axis direction of the polarizer layer described above is preferably in a range of 15°±8°, is more preferably in a range of 15°±6°, and is even more preferably in a range of 15°+3°. Further, in this case, an angle between the slow axis direction of the λ/4 plate described above and the absorption axis direction of the polarizer layer described above is preferably in a range of 75°±8°, is more preferably in a range of 75°±6°, and is even more preferably in a range of 75°±3°. According to the range described above, it is possible to reduce the light leakage of reflection light to the extent of being invisible, and thus setting the angle to be in this range is preferable.

The material of the optical anisotropic support body used in the present invention is not particularly limited. For example, cellulose acylate, a polycarbonate-based polymer, a polyester-based polymer such as polyethylene terephthalate or polyethylene naphthalate, an acrylic polymer such as polymethyl methacrylate, a styrene-based polymer such as polystyrene or an acrylonitrile•styrene copolymer (an AS resin), and the like are able to be used in various polymer films. In addition, one type or two or more types of polymers are selected from polyolefin such as polyethylene and polypropylene, a polyolefin-based polymer such as an ethylene-propylene copolymer, a vinyl chloride-based polymer, an amide-based polymer such as nylon or aromatic polyamide, an imide-based polymer, a sulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an acrylate-based polymer, a polyoxy methylene-based polymer, an epoxy-based polymer, a polymer in which the polymers described above are mixed, and the like, a polymer film is prepared by using the selected polymer as a main component, and the polymer film is able to be used for preparing an optical film in a combination where the properties described above are satisfied.

When the λ/2 plate and the λ/4 plate are a laminated body of a polymer film (a transparent support body) and an optical anisotropic layer, it is preferable that the optical anisotropic layer includes at least one layer formed of a composition containing a liquid crystal compound. That is, it is preferable that the λ/2 plate and the λ/4 plate are a laminated body of the polymer film (the transparent support body) and the optical anisotropic layer formed of the composition containing the liquid crystal compound. A polymer film having small optical anisotropy may be used in the transparent support body, and a polymer film in which optical anisotropy is expressed due to a stretching treatment or the like may be used in the transparent support body. It is preferable that the support body has light transmittance of greater than or equal to 80%.

The type of liquid crystal compound used for forming the optical anisotropic layer which may be included in the λ/2 plate and the λ/4 plate described above is not particularly limited. For example, an optical anisotropic layer obtained by forming a low molecular liquid crystal compound in a nematic alignment in a liquid crystal state, and then by fixing the alignment using optical cross-linkage or thermal cross-linkage and an optical anisotropic layer obtained by forming a high molecular liquid crystal compound in a nematic alignment in a liquid crystal state, and then by fixing the alignment using cooling are able to be used. Furthermore, in the present invention, even when the liquid crystal compound is used in the optical anisotropic layer, the optical anisotropic layer is a layer formed by fixing the liquid crystal compound using polymerization or the like, and it is not necessary to have liquid crystalline properties anymore after the liquid crystal compound is formed into a layer. The polymerizable liquid crystal compound may be a multifunctional polymerizable liquid crystal, or may be a monofunctional polymerizable liquid crystal compound. In addition, the liquid crystal compound may be a discotic liquid crystal compound, or may be a rod-like liquid crystal compound.

In general, the liquid crystal compound is classified into a rod-like type liquid crystal compound and a disk-like type liquid crystal compound according to the shape. Further, the liquid crystal compound includes a low molecular type liquid crystal compound and a high molecular type liquid crystal compound. In general, the polymer indicates a polymer having a degree of polymerization of greater than or equal to 100 (Polymer Physics•Phase Transition Dynamics, authorized by DOI Masao, Page 2, Iwanami Shoten, 1992). In the present invention, any liquid crystal compound is able to be used, and it is preferable that a rod-like liquid crystal compound or a disk-like liquid crystal compound is used. Two or more types of the rod-like liquid crystal compounds, two or more types of the disk-like liquid crystal compounds, or a mixture of the rod-like liquid crystal compound and the disk-like liquid crystal compound may be used. It is more preferable that the optical anisotropic layer is formed by using a rod-like liquid crystal compound or a disk-like liquid crystal compound having a reactive group, and it is even more preferable that at least one has two or more reactive groups in one liquid crystal molecule, from a viewpoint of enabling a temperature change or a humidity change to be reduced. The liquid crystal compound may be two or more types of mixtures, and in this case, it is preferable that at least one has two or more reactive groups.

For example, rod-like liquid crystal compounds disclosed in JP1999-513019A (JP-H11-513019A) or JP2007-279688A are able to be preferably used as the rod-like liquid crystal compound, and discotic liquid crystal compounds disclosed in JP2007-108732A or JP2010-244038A are able to be preferably used as the discotic liquid crystal compound, but the liquid crystal compounds are not limited thereto.

In the optical anisotropic layer described above, it is preferable that the molecules of the liquid crystal compound are fixed into any one of the alignment states of vertical alignment, horizontal alignment, hybrid alignment, and inclination alignment. In order to prepare a phase difference plate having symmetric view angle dependency, it is preferable that a disk-like surface of the discotic liquid crystal compound is substantially vertical to a film surface (the surface of the optical anisotropic layer), or a long axis of the rod-like liquid crystal compound is substantially horizontal to the film surface (the surface of the optical anisotropic layer). The expression "the discotic liquid crystal compound is substantially vertical" indicates that the average value of an angle between the film surface (the surface of the optical anisotropic layer) and the disk-like surface of the discotic liquid crystal compound is in a range of 70° to 90°. The average value of the angle is more preferably 80° to 90°, and is even more preferably 85° to 90°. The expression "the rod-like liquid crystal compound is substantially horizontal" indicates that an angle between the film surface (the surface of the optical anisotropic layer) and a director of the rod-like liquid crystal compound is in a range of 0° to 20°. The angle is more preferably 0° to 10°, and is even more preferably 0° to 5°.

When the $\lambda/2$ plate and the $\lambda/4$ plate described above include the optical anisotropic layer containing the liquid crystal compound, the optical anisotropic layer may be only one layer, or may be a laminated body of two or more optical anisotropic layers.

The optical anisotropic layer described above is able to be formed by applying a coating liquid containing the liquid crystal compound such as the rod-like liquid crystal compound or the discotic liquid crystal compound, as necessary, a polymerization initiator described below, an alignment control agent, or other additives onto the support body. It is preferable that the optical anisotropic layer is formed by forming an alignment film on the support body, and by applying the coating liquid described above onto the surface of the alignment film.

In the present invention, it is preferable that the composition described above is applied onto the surface of the alignment film, and the molecules of the liquid crystal compound are aligned. The alignment film has a function of setting an alignment direction of the liquid crystal compound, and thus it is preferable that the alignment film is used in order to realize a preferred aspect of the present invention. However, when the liquid crystal compound is aligned, and then the alignment state is fixed, the alignment film has the function of setting the alignment direction, and thus the alignment film is not an essential constituent of the present invention. That is, it is possible to prepare the polarizing plate of the present invention by transferring only the optical anisotropic layer on the alignment film in which the alignment state is fixed onto the polarization layer or the support body.

It is preferable that the alignment film is formed by performing a rubbing treatment with respect to a polymer.

Examples of the polymer include a methacrylate-based copolymer, a styrene-based copolymer, polyolefin, polyvinyl alcohol, and modified polyvinyl alcohol disclosed in paragraphs "0022" of the specification of JP1996-338913A (JP-H08-338913A), poly(N-methylol acryl amide), polyester, polyimide, a vinyl acetate copolymer, carboxy methyl cellulose, polycarbonate, and the like. A silane coupling agent is able to be used as the polymer. A water-soluble polymer (for example, poly(N-methylol acryl amide), carboxy methyl cellulose, gelatin, polyvinyl alcohol, and modified polyvinyl alcohol) is preferable, the gelatin, the polyvinyl alcohol, and the modified polyvinyl alcohol are more preferable, and the polyvinyl alcohol and the modified polyvinyl alcohol are particularly preferable. A treatment method which has been widely adopted as a liquid crystal alignment treatment step of an LCD is able to be applied to the rubbing treatment described above. That is, a method is able to be used in which the surface of the alignment film is aligned by being rubbed with paper or gauze, felt, rubber or nylon, a polyester fiber, and the like in a constant direction. In general, the method is performed by averagely rubbing a fiber having a homogeneous length and thickness with fiber-implanted cloth or the like approximately several times.

The composition described above is applied onto the surface of the alignment film which is subjected to the rubbing treatment, and the molecules of the liquid crystal compound are aligned. After that, as necessary, the alignment film polymer reacts with the multifunctional monomer contained in the optical anisotropic layer or the alignment film polymer is cross-linked by using a cross-linking agent, and thus it is possible to form the optical anisotropic layer described above.

It is preferable that the film thickness of the alignment film is in a range of 0.1 µm to 10 µm.

The in-plane retardation (Re) of the transparent support body (the polymer film) supporting the optical anisotropic layer is preferably 0 nm to 50 nm, is more preferably 0 nm to 30 nm, and is even more preferably 0 nm to 10 nm. According to the range described above, it is possible to reduce the light leakage of the reflection light to the extent of being invisible, and thus setting the retardation to be in this range is preferable.

In addition, it is preferable that the retardation (Rth) of the support body in the thickness direction is selected depending on a combination with the optical anisotropic layer which is disposed on or under the support body. Accordingly, it is possible to reduce the light leakage of the reflection light at the time of being observed from the inclined direction, and coloring.

Examples of the polymer include a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester-based resin film such as polyethylene terephthalate or polyethylene naphthalate, a polyacrylic resin film such as a polyether sulfone film and a polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, a polymer having an alicyclic structure (a norbornene-based resin (Arton (a product name), manufactured by JSR Corporation), amorphous polyolefin (Zeonex (a product name), manufactured by Zeon Corporation)), and the like. Among them, the triacetyl cellulose, the polyethylene terephthalate, and the polymer having an alicyclic structure are preferable, and the triacetyl cellulose is particularly preferable.

The transparent support body having a thickness of approximately 10 µm to 200 µm is able to be used, and the thickness of the transparent support body is preferably 10 µm to 80 µm, and is more preferably 20 µm to 60 µm. In addition, the transparent support body may be formed by laminating a plurality of transparent support bodies. In order to suppress external light reflection, it is preferable that the thickness of the transparent support body is thin, and when the thickness of the transparent support body is thinner than 10 µm, intensity of the film decreases, and thus setting the thickness of the transparent support body to be thinner than 10 µm does not tend to be preferable. In order to enhance adhesion between the transparent support body and a layer disposed thereon (an adhesive layer, a vertical alignment film, or a phase difference layer), the transparent support body may be subjected to a surface treatment (for example, a glow discharge treatment, a corona discharge treatment, an ultraviolet (UV) treatment, and a flame treatment). An adhesive layer (an undercoat layer) may be disposed on the transparent support body. In addition, in order to apply slidability in a transportation step or to prevent a back surface from being bonded to the surface after being wound, it is preferable that a transparent support body formed by applying a polymer layer in which inorganic particles having an average particle diameter of approximately 10 nm to 100 nm are mixed at a weight ratio of solid contents of 5% to 40% onto one side of the support body or by cocasting the polymer layer with the support body is used as the transparent support body or a long transparent support body.

Furthermore, in the above description, the λ/2 plate or the λ/4 plate which is a laminated body structure having the optical anisotropic layer disposed on the support body is described, but the present invention is not limited to this aspect, the λ/2 plate and the λ/4 plate may be laminated on one side of one transparent support body, or the λ/2 plate may be laminated on one side of one transparent support body and the λ/4 plate may be laminated on the other side of the transparent support body. Further, the λ/2 plate or the λ/4 plate may be formed of single stretched polymer film (the optical anisotropic support body), or may be formed only of the liquid crystal film which is formed of the composition containing the liquid crystal compound. A preferred example of the liquid crystal film is also identical to the preferred example of the optical anisotropic layer described above.

It is preferable that the λ/2 plate and the λ/4 plate described above are continuously manufactured in a state of a long film. At this time, a slow axis angle of λ/2 or λ/4 is 15°±80 or 75° with respect to a longitudinal direction of the long film described above. Accordingly, in the manufacturing of an optical laminated body described below, the longitudinal direction of the long film described above is allowed to be coincident with a longitudinal direction of a polarizing film, and thus it is possible to bond the films to each other by a roll-to-roll process, and it is possible to manufacture a circularly polarizing plate or an elliptically polarizing plate with high accuracy in an axis angle at the time of bonding and high productivity. Furthermore, when the optical anisotropic layer is formed of the liquid crystal compound, the angle of the slow axis of the optical anisotropic layer is able to be adjusted by a rubbing angle. In addition, when the λ/2 plate or the λ/4 plate is formed of the polymer film (the optical anisotropic support body) which is subjected to a stretching treatment, the angle of the slow axis is able to be adjusted according to a stretching direction.

Next, the aspect (ii) will be described.

A dielectric multilayer film used in the aspect (ii) functions as the reflection polarizer described above, and configures the brightness enhancement film. In the brightness enhancement film, the reflection polarizer (B) described above has a reflection center wavelength in a wavelength range of 430 nm to 480 nm, a peak of reflectivity having a half-value width of less than or equal to 100 nm, a reflection center wavelength in a wavelength range of 500 nm to 600 nm, a peak of reflectivity having a half-value width of less than or equal to 100 nm, a reflection center wavelength in a wavelength range of 600 nm to 650 nm, and a peak of reflectivity having a half-value width of less than or equal to 100 nm, and emits linear polarization light. A case where the reflection polarizer (B) has one flat peak of reflectivity with respect to a wavelength which is approximately constant in all of the wavelength ranges is also included in this aspect.

In FIG. 4 to FIG. 6, an aspect is illustrated in which a dielectric multilayer film 15 is used as a reflection polarizer (B) 13. However, the present invention is not limited by such a specific example, and for convenience, the dielectric multilayer film 15 is illustrated as a laminated body of three layers in the drawings, but the number of laminations is able to be suitably changed in order to attain desired reflectivity.

It is preferable that the dielectric multilayer film used in the aspect (ii) only has a reflection center wavelength in a wavelength range of 430 nm to 480 nm, a peak of reflectivity having a half-value width of less than or equal to 100 nm, a reflection center wavelength in a wavelength range of 500 nm to 600 nm, a peak of reflectivity having a half-value width of less than or equal to 100 nm, a reflection center wavelength in a wavelength range of 600 nm to 650 nm, and a peak of reflectivity having a half-value width of less than or equal to 100 nm, that is, it is preferable that the dielectric multilayer film does not have a peak of reflectivity in a visible light region other than the peak of the reflectivity described above.

It is preferable that the film thickness of the dielectric multilayer film used in the aspect (ii) is thin. The film thickness of the dielectric multilayer film used in the aspect (ii) is preferably 5 µm to 100 µm, is more preferably 10 µm to 50 µm, and is particularly preferably 5 µm to 20 µm.

A manufacturing method of the dielectric multilayer film used in the aspect (ii) is not particularly limited, but the dielectric multilayer film is able to be manufactured with reference to methods disclosed in JP3187821B, JP3704364B, JP4037835B, JP4091978B, JP3709402B, JP4860729B, JP3448626B, and the like, and the contents of these publications are incorporated in the present invention. Furthermore, the dielectric multilayer film indicates a dielectric multilayer reflection polarizing plate or a birefringent interference polarizer of an alternating multilayer film.

<Adhesive Layer>

In the optical sheet member of the present invention, it is preferable that the polarizing plate and the reflection polarizer (B) are laminated in direct contact with each other or through an adhesive layer.

In the optical sheet member of the present invention, it is preferable that the polarizing plate, the λ/4 plate (C), and the reflection polarizer (B) are sequentially laminated in direct contact with each other or through an adhesive layer.

Examples of a method of laminating these members in direct contact with each other are able to include a method of laminating the members by applying a member onto the other member.

In addition, the adhesive layer may be arranged between the members. Examples of the adhesive layer used for laminating the optical anisotropic layer and the polarizing plate include a substance in which a ratio of a modulus of storage elasticity G' and a modulus of loss elasticity G" (tan δ=G"/G') measured by a dynamic viscoelasticity measurement device is 0.001 to 1.5, that is, an adhesive agent or a substance which is easily crept. Examples of an adhesive agent which is able to be used in the present invention include an acrylic adhesive agent or a polyvinyl alcohol-based adhesive agent, but the present invention is not limited thereto.

In the optical sheet member of the present invention, a refractive index difference between the reflection polarizer (B) and a layer adjacent to the reflection polarizer (B) on the polarizing plate side is preferably less than or equal to 0.15, is more preferably less than or equal to 0.10, and is particularly preferably less than or equal to 0.05. Examples of the layer adjacent to the reflection polarizer (B) on the polarizing plate side are able to include the adhesive layer described above.

An adjustment method of the refractive index of such a adhesive layer is not particularly limited, and methods disclosed in JP1999-223712A (JP-H11-223712A) are able to be used as the adjustment method. Among the methods disclosed in JP1999-223712A (JP-H11-223712A), the following aspect is particularly preferable.

Examples of the adhesive agent used in the adhesive layer described above are able to include resins such as a polyester-based resin, an epoxy-based resin, a polyurethane-based resin, a silicone-based resin, and an acrylic resin. These resins may be independently used or two or more types thereof may be used by being mixed. In particular, the acrylic resin is preferable from a viewpoint of excellent reliability such as waterproofness, heat resistance, and light resistance, an excellent adhesion force and transparency, and ease of adjusting a refractive index to be suitable for a liquid crystal display. Examples of the acrylic adhesive agent are able to include an acrylic acid and ester thereof, a methacrylic acid and ester thereof, a homopolymer of an acryl monomer such as acryl amide and acrylonitrile or a copolymer thereof, and a copolymer of at least one type of the acryl monomers described above and an aromatic vinyl monomer such as vinyl acetate, a maleic anhydride, and styrene. In particular, it is preferable that the examples of the acrylic adhesive agent include a main monomer expressing adhesiveness, such as ethylene acrylate, butyl acrylate, and 2-ethyl hexyl acrylate, a monomer which becomes a cohesive component, such as vinyl acetate, acrylonitrile, acryl amide, styrene, methacrylate, and methyl acrylate, and a copolymer which improves an adhesion force or applies a starting point of cross-linkage, and is formed of a functional group-containing monomer such as a methacrylic acid, an acrylic acid, an itaconic acid, hydroxy ethyl methacrylate, hydroxy propyl methacrylate, dimethyl amino ethyl methacrylate, acryl amide, methylol acryl amide, glycidyl methacrylate, and maleic anhydride in which glass transition point (Tg) is in a range of −60° C. to −15° C., and a weight average molecular weight is in a range of 200,000 to 1,000,000.

As a curing agent, one type or two or more types of a metal chelate-based cross-linking agent, an isocyanate-based cross-linking agent, an epoxy-based cross-linking agent are used by being mixed, as necessary. It is practically preferable that such an acrylic adhesive agent is mixed such that an adhesion force is in a range of 100 g/25 mm to 2,000 g/25 mm in a state of containing fillers described below. When the adhesion force is less than 100 g/25 mm, environment resistance deteriorates, and in particular, peeling off may occur at high temperature and high humidity, whereas when the adhesion force is greater than 2000 g/25 mm, rebonding is not able to be performed, and even when the rebonding is able to be performed, the adhesive agent may remain. The refractive index of the acrylic adhesive agent (B method in JIS K-7142) is preferably in a range of 1.45 to 1.70, and is particularly preferably in a range of 1.5 to 1.65.

The fillers for adjusting the refractive index are contained in the adhesive agent. Examples of the fillers are able to include an inorganic white pigment such as silica, calcium carbonate, aluminum hydroxide, magnesium hydroxide, clay, talc, and titanium dioxide, an organic transparent or white pigment such as an acrylic resin, a polystyrene resin, a polyethylene resin, an epoxy resin, and a silicone resin, and the like. When the acrylic adhesive agent is selected, silicone beads and epoxy resin beads are preferable from a viewpoint of having excellent dispersion properties with respect to the acrylic adhesive agent and of obtaining an excellent and homogeneous refractive index. In addition, it is preferable that the fillers are spherical fillers having homogeneous light diffusion.

The particle diameter of such fillers (JIS B9921) is preferably 0.1 μm to 20.0 μm, and is more preferably in a range of 1.0 μm to 10.0 μm. In particular, the particle diameter of the fillers is preferably in a range of 0.5 μm to 10 μm.

In the present invention, the refractive index of the filler (B method in JIS K-7142) preferably has a difference of 0.05 to 0.5 with respect to the refractive index of the adhesive agent, and more preferably has a difference of 0.05 to 0.3.

The content of the fillers in the diffusion adhesive layer is 1.0 mass % to 40.0 mass %, and in particular, is preferably 3.0 mass % to 20 mass %.

[Image Display Device]

The image display device of the present invention includes the optical sheet member of the present invention and the backlight unit, the backlight unit includes a light source emitting blue light which has a light emitting center wavelength in a wavelength range of 430 nm to 480 nm and a peak of light emitting intensity having a half-value width of less than or equal to 100 nm, green light which has a light emitting center wavelength in a wavelength range of 500 nm to 600 nm and a peak of light emitting intensity having a half-value width of less than or equal to 100 nm, and red light which has a light emitting center wavelength in a wavelength range of 600 nm to 650 nm and a peak of light emitting intensity having a half-value width of less than or equal to 100 nm, and the backlight unit includes a reflection member in a rear portion of the light source, which converts a polarization state of light emitted from the light source and reflected on the optical sheet member and reflects the light.

A difference between a wavelength applying a peak of light emitting intensity of the blue light, the green light, and the red light of the backlight unit and a wavelength applying a peak of each color of the brightness enhancement film is preferably less than or equal to 50 nm, and is more preferably less than or equal to 20 nm.

<Backlight Unit>

The configuration of the backlight unit may be an edge light mode in which a light guide plate, a reflection plate, or the like is used as a configuration member, or may be a direct backlight mode, and it is preferable that the backlight unit includes the reflection member in the rear portion of the light source, which converts the polarization state of the light emitted from the light source and reflected on the optical sheet member and reflects the light. Such a reflection member is not particularly limited, but known reflection members disclosed in JP3416302B, JP3363565B, JP4091978B, JP3448626B, and the like are able to be used as the reflection member, and the contents of the publications are incorporated in the present invention.

In the present invention, it is preferable that the light source of the backlight unit includes a blue light emitting diode emitting the blue light described above and a fluorescent material emitting the green light and the red light described above when the blue light of the blue light emitting diode described above is incident thereon.

Furthermore, the blue light emitting diode emitting the blue light described above, a green light emitting diode emitting the green light described above, and a red light emitting diode emitting the red light described above may be used as the light source of the backlight unit.

Examples of the fluorescent material include a yttrium·aluminum·garnet-based yellow fluorescent body, a terbium·aluminum-garnet-based yellow fluorescent body, and the like. The fluorescent wavelength of the fluorescent material is able to be controlled by changing the particle diameter of the fluorescent body.

In the image display device of the present invention, it is preferable that the blue light emitting diode emitting the blue light described above and the fluorescent material emitting the green light and the red light described above when the blue light of the blue light emitting diode described above is incident thereon are quantum dot members (for example, a quantum dot sheet or a bar-like quantum dot bar), and the quantum dot member is arranged between the optical sheet member and a blue light source. Such a quantum dot member is not particularly limited, but known quantum dot members disclosed in JP2012-169271A, SID'12 DIGEST p. 895 and the like are able to be used, and the contents of this literature are incorporated in the present invention. In addition, a Quantum Dot Enhancement Film (QDEF, manufactured by NanoSys InC.) is able to be used as the quantum dot sheet.

In the optical sheet member of the present invention, it is preferable that the quantum dot member described above emits fluorescent light in which at least a part of the polarization properties of an incidence ray is held from a viewpoint of brightness enhancement and low power consumption. A quantum dot material (including particles having a quantum effect, such as quantum dot particles, quantum rod particles, and quantum tetrapod particles) is able to be used as the quantum dot member described above which is able to emit the fluorescent light in which at least a part of the polarization properties of the incidence ray is held. In addition, it is preferable that quantum rod particles disclosed in non-patent literature (THE PHYSICAL CHEMISTRY LETTERS 2013, 4, 502-507) are used from a viewpoint of holding the polarization properties of the fluorescent light. The expression "the quantum dot member emits the fluorescent light in which a part of the polarization properties of the incidence ray is held" indicates that, when light having a polarization degree of 99.9% is incident on the quantum dot member, the polarization degree of the fluorescent light emitted from the quantum dot member is not 0%/o, but the polarization degree is preferably 10% to 80%, is more preferably 80% to 99%, and is even more preferably 99% to 99.9%.

In the image display device of the present invention, it is preferable that the backlight unit includes a wavelength selective filter for a blue color which selectively transmits light having a wavelength shorter than 460 nm among the blue light rays described above.

In the image display device of the present invention, it is preferable that the backlight unit includes a wavelength selective filter for a red color which selectively transmits light having a wavelength longer than 630 nm among the red light rays described above.

Such a wavelength selective filter for a blue color or wavelength selective filter for a red color is not particularly limited, but known wavelength selective filters disclosed in JP2008-52067A and the like are able to be used, and the contents of the publications are incorporated in the present invention.

In addition, it is preferable that the backlight unit includes a known diffusion plate or diffusion sheet, a prism sheet (for example, BEF and the like), and a light guide device.

Examples of other members include members disclosed in JP3416302B, JP3363565B, JP4091978B, JP3448626B, and the like, and the contents of the publications are incorporated in the present invention.

<Display Panel>

Examples of the image display device described above are able to include a liquid crystal display (LCD), a plasma display (PDP), an electroluminescence display (OELD or IELD), a field emission display (FED), a touch panel, electronic paper, and the like.

A preferred example of a display panel of the image display device is a transmissive mode liquid crystal panel, and the panel includes a liquid crystal cell between a pair of polarizers. In general, a retardation film for compensating a view angle is arranged between each of the polarizers and the liquid crystal cell. The configuration of the liquid crystal cell is not particularly limited, and a liquid crystal cell having a general configuration is able to be adopted. The liquid crystal cell, for example, includes a pair of substrates which are arranged to face each other, and a liquid crystal layer interposed between the pair of substrates, and as necessary, may include a color filter layer and the like. The driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode are able to be used.

It is preferable that the liquid crystal cell used in the image display device having an liquid crystal panel of the present invention is in a VA mode, an OCB mode, an IPS mode, or a TN mode, but the present invention is not limited thereto.

In the liquid crystal cell of the TN mode, rod-like liquid crystal molecules are substantially horizontally aligned at the time of not applying a voltage, and are twistedly aligned by 60° to 120°. The liquid crystal cell of the TN mode is mostly used as a color TFT liquid crystal display device, and is disclosed in a plurality of literatures.

In the liquid crystal cell of the VA mode, the rod-like liquid crystal molecules are substantially vertically aligned at the time of not applying a voltage. The liquid crystal cell of the VA mode includes (1) a liquid crystal cell of a VA mode in the narrow sense in which rod-like liquid crystal molecules are substantially vertically aligned at the time of not applying a voltage, and are substantially horizontally aligned at the time of applying a voltage (disclosed in JP1990-176625A (JP-H02-176625A)), (2) a liquid crystal cell for widening a view angle in which a VA mode is a multidomain (an MVA mode) (disclosed in SID97, Digest of tech. Papers (Proceedings) 28 (1997) 845), (3) a liquid crystal cell of a mode (an n-ASM mode) in which rod-like liquid crystal molecules are substantially vertically aligned at the time of not applying a voltage, and are twistedly multidomain-aligned at the time of applying a voltage (disclosed in Proceedings of Japan Liquid Crystal Conference 58 to 59 (1998)), and (4) a liquid crystal cell of a SURVIVAL mode (published in LCD International 98). In addition, the liquid crystal cell may be any one of a Patterned Vertical Alignment (PVA) type liquid crystal cell, an Optical Alignment type liquid crystal cell, and a Polymer-Sustained Alignment (PSA) liquid crystal cell. The details of these modes are specifically disclosed in JP2006-215326A and JP2008-538819A.

In the liquid crystal cell of the IPS mode, the rod-like liquid crystal molecules are aligned to be substantially parallel to the substrate, and an electric field which is parallel to the surface of the substrate is applied, and thus the liquid crystal molecule planarly responds. In the IPS mode, black display is performed in a state of not applying an electric field, and the absorption axes of a pair of upper and lower polarizing plates are orthogonal to each other.

Methods in which leaked light in the inclined direction at the time of the black display is reduced by using the optical compensation sheet, and thus a view angle is improved are disclosed in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

It is preferable that an embodiment of the liquid crystal display device includes a liquid crystal cell in which a liquid crystal layer is interposed between facing substrates of which at least one includes an electrode, and the liquid crystal cell is configured by being arranged between two polarizing plates. The liquid crystal display device includes the liquid crystal cell in which a liquid crystal is sealed between upper and lower substrates, changes the alignment state of the liquid crystal by applying a voltage, and thus displays an image. Further, as necessary, the liquid crystal display device includes an associated functional layer such as a polarizing plate protective film or an optical compensation member performing optical compensation, and an adhesive layer. In addition, the image display device of the present invention may include other members. For example, a surface layer such as a forward scattering layer, a primer layer, an antistatic layer, and an undercoat layer may be arranged along with (or instead of) a color filter substrate, a thin layer transistor substrate, a lens film, a diffusion sheet, a hard coat layer, an antireflection layer, a low reflection layer, an antiglare layer, and the like.

Figure 7:
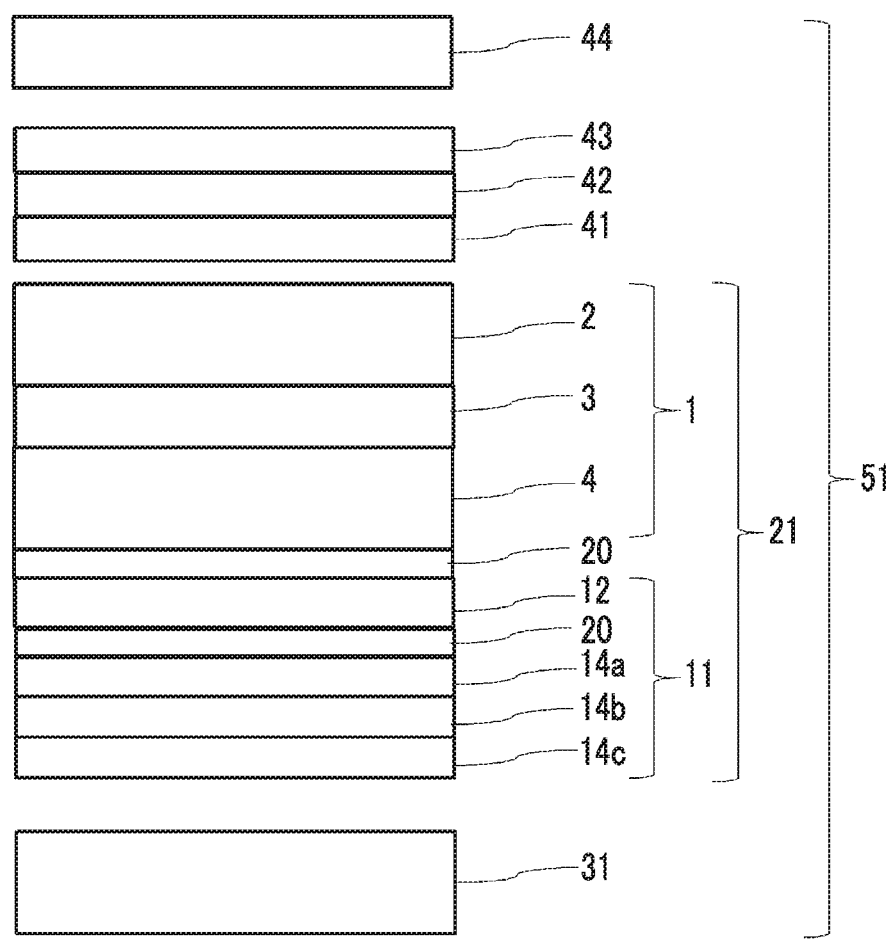
FIG. 7 is a schematic view illustrating a sectional surface of an example of a liquid crystal display device which is an image display device of the present invention.

In FIG. 7, an example of a configuration of a case where the image display device of the present invention is a liquid crystal display device is illustrated. In FIG. 7, an image display device 51 is formed by laminating the backlight unit 31, the optical sheet member 21 of the present invention (a laminated body of the brightness enhancement film 11 and the backlight side polarizing plate 1), a thin layer transistor substrate 41, a liquid crystal cell 42, a color filter substrate 43, and a display side polarizing plate 44 in this order.

Furthermore, the configuration of the optical sheet member 21 of the present invention is illustrated in FIG. 7 by using the configuration of FIG. 2 as a representative example, but the image display device of the present invention is not limited to the configuration of FIG. 2 by such an example.

(Color Filter)

When the light source uses visible B of less than or equal to 500 nm, a pixel in the present invention is able to be formed by using various known methods as a method of forming an RGB pixel. For example, a photomask is able to be formed on a glass substrate, a desired black matrix is able to be formed thereon by using the photoresist, and a pixel pattern of R, G, B is able to be formed thereon, and an ink composition is discharged by using a printing device of an ink jet method until a desired concentration is obtained in a region (a concave portion surrounded by a convex portion) which is partitioned by a black matrix having a predetermined width and a black matrix having a width wider than that of the black matrix described above at every n black matrices by using a coloring ink for a pixel of R, G and B, and thus a color filter formed of the pattern of R, G, and B is able to be prepared. After image coloring, each pixel and the black matrix may be completely cured by baking or the like.

Preferred properties of the color filter are disclosed in JP2008-083611A and the like, and the contents of the publications are incorporated in the present invention.

For example, it is preferable that one wavelength at which the transmittance is half of the maximum transmittance in a color filter exhibiting a green color is greater than or equal to 590 nm and less than or equal to 610 nm, and the other is greater than or equal to 470 nm and less than or equal to 500 nm. In addition, it is preferable that one wavelength at which the transmittance is half of the maximum transmittance described above in the color filter exhibiting a green color is greater than or equal to 590 nm and less than or equal to 600 nm. Further, it is preferable that the maximum transmittance of the color filter exhibiting a green color is greater than or equal to 80%. It is preferable that a wavelength at which the transmittance is the maximum transmittance in the color filter exhibiting a green color is greater than or equal to 530 nm and less than or equal to 560 nm.

In the light source of the light source unit described above, it is preferable that the wavelength of a light emitting peak in a wavelength region of greater than or equal to 600 nm and less than or equal to 700 nm is greater than or equal to 620 nm and less than or equal to 650 nm. The light source of the light source unit described above has a light emitting peak in a wavelength region of greater than or equal to 600 nm and less than or equal to 700 nm, and in the color filter exhibiting a green color, it is preferable that the transmittance at the wavelength of the light emitting peak described above is less than or equal to 10% of the maximum transmittance.

In the color filter exhibiting the red color described above, it is preferable that the transmittance at a wavelength of greater than or equal to 580 nm and less than or equal to 590 nm is less than or equal to 10% of the maximum transmittance.

As the pigment for a color filter, in a blue color, a complementary pigment C.I. Pigment Violet 23 is used in C.I. Pigment Blue 15:6. In a red color, C.I. Pigment Yellow 139 is used in C.I. Pigment Red 254 as a pigment for a complementary color. As the pigment for a green color, in general, C.I. Pigment Yellow 150, C.I. Pigment Yellow 138, and the like are used in C.I. Pigment Green 36 (copper bromide phthalocyanine green) and C.I. Pigment Green 7 (copper chloride phthalocyanine green) as a pigment for a complementary color. These pigments are able to be controlled by adjusting the composition of the pigment. The composition of the complementary pigment is increased by a small amount with respect to a comparative example, and thus it is possible to set a half-value wavelength on the long wavelength side to be in a range of 590 nm to 600 nm. Furthermore, currently, the pigment is generally used, but a color filter of a dye may be used insofar as the pigment is able to control a spectrum and to ensure process stability and reliability.

(Black Matrix)

In the image display device of the present invention, the black matrix is arranged between the respective pixels. Examples of a material forming a black stripe include a material using a sputtered film of metal such as chromium, a light shielding photosensitive composition in which a photosensitive resin, a black coloring agent, and the like are combined, and the like. Specific examples of the black coloring agent include carbon black, titanium carbon, iron oxide, titanium oxide, graphite, and the like, and among them, the carbon black is preferable.

(Thin Layer Transistor)

It is preferable that the image display device of the present invention further includes a TFT substrate including a thin layer transistor (hereinafter, referred to as a TFT).

It is preferable that the thin layer transistor described above includes an oxide semiconductor layer having a carrier concentration of less than $1\times10^{14}/cm^3$. A preferred aspect of the thin layer transistor described above is disclosed in JP2011-141522A, and the contents of the publication are incorporated in the present invention.

<Method of Bonding Optical Sheet Member to Image Display Device>

A known method is able to be used as a method of bonding the optical sheet member of the present invention to the image display device such as a liquid crystal display device. In addition, a roll-to-panel manufacturing method is able to be used, and the roll-to-panel manufacturing method is preferable from a viewpoint of improving productivity and yield. The roll-to-panel manufacturing method is disclosed in JP2011-48381A, JP2009-175653A, JP4628488B, JP4729647B, WO2012/014602A, WO2012/014571A, and the like, but the present invention is not limited thereto.

EXAMPLES

Hereinafter, the characteristics of the present invention will be more specifically described with reference to examples and comparative examples. Materials, used amounts, ratios, treatment contents, treatment sequences, and the like of the following examples are able to be suitably changed unless the changes cause deviance from the gist of the present invention.

Therefore, the range of the present invention will not be restrictively interpreted by the following specific examples.

Manufacturing Example 1

<Preparation of Polarizing Plate>

A retardation film was prepared by using a commercially available cellulose acylate-based film "TD80UL" (manufactured by Fujifilm Corporation) as a front-side polarizing plate protective film of a backlight side polarizing plate.

A commercially available cellulose acylate-based film "TD80UL" (manufactured by Fujifilm Corporation) was used as a rear-side polarizing plate protective film of the backlight side polarizing plate.

As described in "0219" to "0220" of JP2006-293275A, a polarizer was manufactured, and the retardation film and the polarizing plate protective film described above were bonded to both surfaces of the polarizer, and thus a polarizing plate was manufactured.

Example 1

<Formation of Broadband λ/4 Plate>

As described in "0020" to "0033" of JP2003-262727A, a broadband a/4 plate was prepared. The broadband λ/4 plate was obtained by applying a liquid crystal material of two layers onto a substrate, and by performing polymerization with respect to the liquid crystal material, and then by peeling off the liquid crystal material from the substrate.

In the obtained broadband λ/4 plate, Re(450) was 110 nm, Re(550) was 135 nm, Re(630) was 140 nm, and the film thickness was 1.6 Gm.

The obtained broadband λ/4 plate and the polarizing plate manufactured as described above were bonded to each other by using an acrylic adhesive agent having a refractive index of 1.47.

<Formation of Reflection Polarizer>

A first light reflecting layer formed by fixing a cholesteric liquid crystalline phase, a second light reflecting layer formed by fixing a cholesteric liquid crystalline phase, and a third light reflecting layer formed by fixing a cholesteric liquid crystalline phase were formed on the obtained broadband λ/4 plate according to coating by changing the added amount of a chiral agent used with reference to JP2013-203827A (disclosed in "0016" to "0148") and Fuji Film Research & Development No. 50 (2005) pp. 60 to 63.

In the obtained the first light reflecting layer, the reflection center wavelength of the peak of the maximum reflectivity was 450 nm, the half-value width was 40 nm, and the film thickness was 1.8 μm.

In the obtained second light reflecting layer, the reflection center wavelength of the peak of the maximum reflectivity was 550 nm, the half-value width was 50 nm, and the film thickness was 2.0 μm.

In the obtained third light reflecting layer, the reflection center wavelength of the peak of the maximum reflectivity was 630 nm, the half-value width was 60 nm, and the film thickness was 2.1 μm.

Furthermore, the average refractive index of the first light reflecting layer, the second light reflecting layer, and the third light reflecting layer was 1.57.

In addition, the total thickness of a brightness enhancement film including the obtained broadband λ/4 plate and a reflection polarizer was 7.5 μm.

Thus, a laminated body of the obtained polarizing plate and the brightness enhancement film was an optical sheet member of Example 1.

<Manufacturing of Liquid Crystal Display Device>

A commercially available liquid crystal display device (a product name of TH-L42D2, manufactured by Panasonic Corporation) was disassembled, the optical sheet member of Example 1 was used as the backlight side polarizing plate, and a backlight unit was changed to the following RGB narrowband backlight unit, and thus a liquid crystal display device of Example 1 was manufactured.

The used RGB narrowband backlight unit included a blue light emitting diode (B-LED manufactured by Nichia Corporation, a main wavelength of 465 nm, and a half-value width of 20 nm) as a light source. In addition, a quantum dot member which emitted fluorescent light of green light having a center wavelength of 535 nm and a half-value width of 40 nm and red light having a center wavelength of 630 nm and a half-value width of 40 nm when the blue light of the blue light emitting diode was incident was included in a front portion of the light source. In addition, a reflection member which converted the polarization state of light emitted from the light source and reflected on the optical sheet member described above and reflected the light was included in a rear portion of the light source.

Examples 1A, 2A, 3A, 4A, 5A, and 6A

Optical sheet members and liquid crystal display devices of Examples 1A, 2A, 3A, 4A, 5A, and 6A were prepared by changing only the following conditions from Example 1.

"QL Film" manufactured by Fujifilm Corporation was used in the λ/4 plate positioned between the polarizer of the backlight side polarizing plate and the reflection polarizer. In this film, Re(550) was 125 nm, and Rth(550) was approximately 0 nm.

The QL film was directly bonded to the polarizer of the backlight side polarizing plate without using the polarizing plate protective film of the backlight side polarizing plate which was used in Example 1, and thus the λ/4 plate and the polarizing plate protective film were used together.

Each light reflecting layer was formed by changing a coating sequence such that the arrangement sequence of the light reflecting layer (a sequence from the light source side, and in Table 2 to Table 5 described below, the first light reflecting layer described above in which the reflection center wavelength of the peak of the maximum reflectivity was 450 nm, the half-value width was 40 nm, and the film thickness was 1.8 μm was denoted by B, the second light reflecting layer described above in which the reflection center wavelength of the peak of the maximum reflectivity was 550 urn, the half-value width was 50 nm, and the film thickness was 2.0 μm was denoted by C, and the third light reflecting layer in which the reflection center wavelength of the peak of the maximum reflectivity was 630 nm, the half-value width was 60 nm, and the film thickness was 2.1 μm was denoted by R) was as shown in the following table, and then was arranged. Except for this, the light reflecting layer was prepared by the same method as that in Example 1.

In evaluation, (4) Color Shift Evaluation in an inclined azimuth described below was performed in addition to evaluation of Example 1.

Examples 1B to 1F

An optical sheet member and a liquid crystal display device were prepared by the same method as that in Example 1A except that only Rth of the QL film was changed from Example 1A. Rth was changed by forming an optical anisotropic layer by vertically aligning LC242 manufactured by BASF Japan Ltd. on the QL film as a rod-like liquid crystal (RLC) according to a method disclosed in the example of JP2012-517024A.

Examples 2B to 2F

An optical sheet member and a liquid crystal display device were prepared by the same method as that in Example 2A except that only Rth of the QL film was changed from Example 2A. Rth was changed by forming an optical anisotropic layer by vertically aligning LC242 manufactured by BASF Japan Ltd on the QL film as a rod-like liquid crystal (RLC) according to a method disclosed in the example of JP2012-517024A.

Examples 3B to 3F

An optical sheet member and a liquid crystal display device were prepared by the same method as that in Example 3A except that only Rth of the QL film was changed from Example 3A. Rth was changed by forming an optical anisotropic layer by vertically aligning LC242 manufactured by BASF Japan Ltd on the QL film as a rod-like liquid crystal (RLC) according to a method disclosed in the example of JP2012-517024A.

Examples 4B to 4F

An optical sheet member and a liquid crystal display device were prepared by the same method as that in Example 4A except that only Rth of the QL film was changed from Example 4A. Rth was changed by forming an optical anisotropic layer by vertically aligning LC242 manufactured by BASF Japan Ltd on the QL film as a rod-like liquid crystal (RLC) according to a method disclosed in the example of JP2012-517024A.

Examples 5B to 5F

An optical sheet member and a liquid crystal display device were prepared by the same method as that in Example 5A except that only Rth of the QL film was changed from Example 5A. Rth was changed by forming an optical anisotropic layer by vertically aligning LC242 manufactured by BASF Japan Ltd on the QL film as a rod-like liquid crystal (RLC) according to a method disclosed in the example of JP2012-517024A.

Examples 6B to 6F

An optical sheet member and a liquid crystal display device were prepared by the same method as that in Example 6A except that only Rth of the QL film was changed from Example 6A. Rth was changed by forming an optical anisotropic layer by vertically aligning LC242 manufactured by BASF Japan Ltd on the QL film as a rod-like liquid crystal (RLC) according to a method disclosed in the example of JP2012-517024A.

Examples 2 and 3

Optical sheet members and liquid crystal display devices of Examples 2 and 3 were manufactured by the same method as that in Example 1 except that the coating thickness of the first light reflecting layer, the second light reflecting layer, and the third light reflecting layer was changed, and the total thickness of the brightness enhancement film in Example 1 was as shown in Table 5 described below.

Example 4

An optical sheet member and a liquid crystal display device of Example 4 were manufactured by the same method as that in Example 1 except that the adhesive agent for adhesion between the reflection polarizer and the polarizing plate in Example 1 was changed to an adhesive agent having a refractive index of 1.55.

Example 5

An RGB narrowband dielectric multilayer film 1 which was prepared by the following method was bonded to the polarizing plate manufactured in Manufacturing Example 1 using the same adhesive agent as that of Example 1, and thus an optical sheet member of Example 5 was manufactured.

The RGB narrowband dielectric multilayer film 1 was manufactured such that the reflection center wavelength of the peak of the maximum reflectivity in a wavelength range corresponding to the blue light was 460 nm, the half-value width was 30 nm, the reflection center wavelength of the peak of the maximum reflectivity in a wavelength range corresponding to the green light was 540 nm, the half-value width was 35 nm, the reflection center wavelength of the peak of the maximum reflectivity in a wavelength range corresponding to the red light was 630 nm, and the half-value width was 40 nm by changing the total thickness of the brightness enhancement film as shown in Table 5 described below with reference to IDW/AD '12, p. 985 to 988 (2012).

A liquid crystal display device of Example 5 was manufactured by the same method as that in Example 1 except that the optical sheet member of Example 5 was used instead of the optical sheet member of Example 1 in the manufacturing of the liquid crystal display device of Example 1.

Example 6

An optical sheet member and a liquid crystal display device of Example 6 were manufactured by the same method as that in Example 1 except that the center wavelength of the peak of the maximum reflectivity in the first light reflecting layer was 490 nm, the reflection center wavelength of the peak of the maximum reflectivity in the second light reflecting layer was 560 nm, and the reflection center wavelength of the peak of the maximum reflectivity in the third light reflecting layer was 655 nm by changing the added amount of the chiral agent of the reflection polarizer in Example 1.

Example 10

An optical sheet member and a liquid crystal display device of Example 10 were prepared by changing only the following conditions from Example 1.

A polycarbonate h/4 film was used in the λ/4 plate positioned between the polarizer of the backlight side polarizing plate and the reflection polarizer. The polycarbonate film having a thickness of 50 μm was subjected to a 2.5% stretching treatment at 150° C., and thus a λ/4 film was prepared. In this film, Re(550) was 125 nm, and Rth(550) was 63 nm.

The polycarbonate λ/4 film described above was directly bonded to the polarizer of the backlight side polarizing plate without using the protective film of the polarizing plate used in Example 1, and thus the λ/4 plate and the polarizing plate protective film were used together. Except for this, the optical sheet member and a liquid crystal display device were prepared by the same method as that in Example 1.

Comparative Example 1

A commercially available liquid crystal display device (a product name of TH-L42D2, manufactured by Panasonic Corporation) was disassembled, the polarizing plate manufactured in Manufacturing Example 1 was used as the backlight side polarizing plate, and a dielectric multilayer film (a product name of DBEF, manufactured by 3M Company, in Table 2 described below, described as DBEF of the related art) was separately arranged between the backlight side polarizing plate and the backlight unit without disposing the adhesive agent, and thus a liquid crystal display device of Comparative Example 1 was manufactured.

The dielectric multilayer film (a product name of DBEF) had reflectivity of a flat peak with respect to an approximately constant wavelength in 450 nm to 550 nm to 630 nm of a blue region to a green region to a red region.

In the backlight light source of this liquid crystal display device, the light emitting peak wavelength of the blue light was 450 nm. In a green region to a red region, the number of light emitting peaks was one, the peak wavelength was 550 nm, and the half-value width was 100 nm.

Comparative Example 2

An optical sheet member of Comparative Example 2 was manufactured by the same method as that in Example 1 except that broadband cholesteric liquid crystalline phases of five layers were laminated instead of the first light reflecting layer, the second light reflecting layer, and the third light reflecting layer, and the total thickness of the brightness enhancement film was changed as shown in Table 2 described below in Example 1. Furthermore, in Table 2 described below, the peak wavelength of the broadband cholesteric liquid crystalline phases of the five layers were sequentially described from the light source side.

In addition, a liquid crystal display device of Comparative Example 2 was manufactured by the same method as that in Example 1 except that the optical sheet member of Comparative Example 2 was used instead of the optical sheet member of Example 1, and the same backlight unit as that of Comparative Example 1 was used without changing the backlight unit in the manufacturing of the liquid crystal display device of Example 1.

[Evaluation]

The optical sheet members and the liquid crystal display devices of the respective examples and comparative examples were evaluated according to the following criteria. Furthermore, in the respective examples except for Example 5, the evaluation was based on Comparative Example 2, and in Example 5, the evaluation was based on Comparative Example 1.

(1) Front Brightness

Front brightness of the liquid crystal display device was measured by using a method disclosed in "0180" of JP2009-93166A. The results thereof were evaluated on the basis of the following criteria.

5: Excellent when the front brightness is greater than the front brightness of the liquid crystal display device of Comparative Example 1 or 2 by greater than or equal to 30%
4: Excellent when the front brightness is greater than the front brightness of the liquid crystal display device of Comparative Example 1 or 2 by greater than or equal to 20% and less than 30%
3: Excellent when the front brightness is greater than the front brightness of the liquid crystal display device of Comparative Example 1 or 2 by greater than or equal to 10% and less than 20%
2: The front brightness is equal to of less than the front brightness of the liquid crystal display device of Comparative Example 1 or 2.

The results are shown in Tables 2 to 5 described below.

(2) Front Contrast

Front contrast of the liquid crystal display device was measured by using a method disclosed in "0180" of JP2009-93166A. The results thereof were evaluated on the basis of the following criteria.

4: Excellent when the front contrast is greater than the front contrast of the liquid crystal display device of Comparative Example 1 or 2 by greater than or equal to 20%
3: Excellent when the front contrast is greater than the front contrast of the liquid crystal display device of Comparative Example 1 or 2 by greater than or equal to 10% and less than 20%
2: The front contrast is equal to or less than the front contrast of the liquid crystal display device of Comparative Example 1 or 2.

The results are shown in Tables 2 to 5 described below.

(3) Color Reproducing Region

A color reproducing region of the liquid crystal display device was measured by using a method disclosed in "0066" of JP2012-3073A. The results thereof were evaluated on the basis of the following criteria.

4: Excellent when the NTSC ratio is greater than the NTSC ratio of the liquid crystal display device of Comparative Example 1 or 2 by greater than or equal to 20%

3: Excellent when the NTSC ratio is greater than the NTSC ratio of the liquid crystal display device of Comparative Example 1 or 2 by greater than or equal to 10% and less than 20%

2: The NTSC ratio is equal to or less than the NTSC ratio of the liquid crystal display device of Comparative Example 1 or 2.

The results are shown in Tables 2 to 5 described below.

(4) Color Shift Evaluation

In Examples 1A to 1F, 2A to 2F, 3A to 3F, 4A to 4F, 5A to 5F, and 6A to 6F (that is, the examples except for Examples 1 to 6 and 10), color shift evaluation of the liquid crystal display device in the inclined azimuth was performed. The color shift evaluation was performed on the basis of the following four-step criteria by visually confirming a color shift from an angle of 60 degrees with respect to the front surface in a horizontal direction at the time of white display of the liquid crystal display device.

4: The color shift is barely observed.
3: Color shift is slightly observed.
2: The color shift is somewhat observed (allowable).
1: The color shift is noticeable.

The results are shown in Tables 2 to 4 described below.

TABLE 2

| | | | Comparative Example 1 | Comparative Example 2 | Example 1 |
|---|---|---|---|---|---|
| Liquid Crystal Display Device | Polarizing Plate | Polarizer | Present | Present | Absent |
| | | Polarizing Plate Protective Film | TAC Film of Related Art | TAC Film of Related Art | TAC Film of Related Art |
| | Brightness Enhancement Film | Between Polarizing Plate Protective Film and Reflection Polarizer | Absent (Air Layer) | Broadband λ/4 (Integrated with Polarizing Plate Protective Film and Reflection Polarizer through Adhesive Agent) | Broadband λ/4 (Integrated with Polarizing Plate Protective Film and Reflection Polarizer through Adhesive Agent) |
| | | Difference in Average Refractive Index between Reflection Polarizer and Material Thereon (Adhesive Material or Air) | 1.57 | 0.1 | 0.1 |
| | | Reflection Polarizer | DBEF of Related Art | Five Broadband Cholesteric Layers | Three RGB Narrowband Cholesteric Layers |
| | | | — | 430 | — |
| | | Peak Wavelength of First Light Reflecting Layer | — | 490 | 450 |
| | | Peak Wavelength of Second Light Reflecting Layer | — | 550 | 550 |
| | | Peak Wavelength of Third Light Reflecting Layer | — | 610 | 630 |
| | | | — | 670 | — |
| | | Arrangement Sequence of Light Reflecting Layer (Sequence from Light Source Side. First Light Reflecting Layer is Referred to as B, Second Light Reflecting Layer is Referred to as G, and Third Light Reflecting Layer is Referred to as R) | | | BGR |
| | | Total Thickness of Brightness Enhancement Film (μm) | 25 | 13 | 7.5 |
| | Backlight | Type | LED_BKL of Related Art | LED_BKL of Related Art | RGB Narrowband Backlight (Blue LED + Quantum Dot Material) |
| | | Main Wavelength | Not Applying Peak | Not Applying Peak | 465 |
| | | Center Wavelength | 550 | 550 | 535 |
| | | Center Wavelength | Not Applying Peak | Not Applying Peak | 630 |
| Performance | | Front Brightness | 2 | 2 | 4 |
| | | Front Contrast | 2 | 2 | 4 |
| | | Color Reproducing Region | 2 | 2 | 4 |
| | | Color Shift in Inclined Azimuth | — | — | — |

TABLE 2-continued

|  |  |  | Example 1A | Example 2A | Example 3A | Example 4A | Example 5A | Example 6A |
|---|---|---|---|---|---|---|---|---|
| Liquid Crystal Display Device | Polarizing Plate | Polarizer | Present | | | | | |
| | | Polarizing Plate Protective Film | Absent | | | | | |
| | Brightness Enhancement Film | Between Polarizing Plate Protective Film and Reflection Polarizer | QL Film (Polarizing Plate Protective Film and Reflection Polarizer Are Integrated through Adhesive Agent. Rth~0 nm) | | | | | |
| | | Difference in Average Refractive Index between Reflection Polarizer and Material Thereon (Adhesive Material or Air) | 0.1 | | | | | |
| | | Reflection Polarizer | Three RGB Narrowband Cholesteric Layers | | | | | |
| | | Peak Wavelength of First Light Reflecting Layer | 450 | | | | | |
| | | Peak Wavelength of Second Light Reflecting Layer | 550 | | | | | |
| | | Peak Wavelength of Third Light Reflecting Layer | 630 | | | | | |
| | | Arrangement Sequence of Light Reflecting Layer (Sequence from Light Source Side. First Light Reflecting Layer is Referred to as B, Second Light Reflecting Layer is Referred to as G, and Third Light Reflecting Layer is Referred to as R) | BRG | BGR | GBR | GRB | RBG | RGB |
| | | Total Thickness of Brightness Enhancement Film (μm) | 7.5 | | | | | |
| | Backlight | Type | RGB Narrowband Backlight (Blue LED + Quantum Dot Material) | | | | | |
| | | Main Wavelength | 465 | | | | | |
| | | Center Wavelength | 535 | | | | | |
| | | Center Wavelength | 630 | | | | | |
| Performance | | Front Brightness | 3 | 3 | 3 | 3 | 3 | 3 |
| | | Front Contrast | 4 | 4 | 4 | 4 | 4 | 4 |
| | | Color Reproducing Region | 4 | 4 | 4 | 4 | 4 | 4 |
| | | Color Shift in Inclined Azimuth | 4 | 3 | 3 | 2 | 2 | 2 |

|  |  |  | Example 1B | Example 1C | Example 1D | Example 1E | Example 1F |
|---|---|---|---|---|---|---|---|
| Liquid Crystal Display Device | Polarizing Plate | Polarizer | Present | | | | |
| | | Polarizing Plate Protective Film | Absent | | | | |
| | Brightness Enhancement Film | Between Polarizing Plate Protective Film and Reflection Polarizer | λ/4: Rth −220 nm | λ/4: Rth −50 nm | λ/4: Rth −400 nm | λ/4: Rth −20 nm | λ/4: Rth −430 nm |
| | | Difference in Average Refractive Index between Reflection Polarizer and Material Thereon (Adhesive Material or Air) | 0.1 | | | | |
| | | Reflection Polarizer | Three RGB Narrowband Cholesteric Layers | | | | |
| | | Peak Wavelength of First Light Reflecting Layer | 450 | | | | |
| | | Peak Wavelength of Second Light Reflecting Layer | 550 | | | | |
| | | Peak Wavelength of Third Light Reflecting Layer | 630 | | | | |
| | | Arrangement Sequence of Light Reflecting Layer (Sequence from Light Source Side. First Light Reflecting Layer is Referred to as B, Second Light Reflecting Layer is Referred to as G, and Third Light Reflecting Layer is Referred to as R) | BRG | | | | |
| | | Total Thickness of Brightness Enhancement Film (μm) | 7.5 | | | | |

TABLE 2-continued

| | Backlight | Type | RGB Narrowband Backlight (Blue LED + Quantum Dot Material) | | | | |
|---|---|---|---|---|---|---|---|
| | | Main Wavelength | 465 | | | | |
| | | Center Wavelength | 535 | | | | |
| | | Center Wavelength | 630 | | | | |
| Performance | | Front Brightness | 3 | 3 | 3 | 3 | 3 |
| | | Front Contrast | 4 | 4 | 4 | 4 | 4 |
| | | Color Reproducing Region | 4 | 4 | 4 | 4 | 4 |
| | | Color Shift in Inclined Azimuth | 4 | 3 | 3 | 2 | 2 |

TABLE 3

| | | | Example 2B | Example 2C | Example 2D | Example 2E | Example 2F | Example 3B | Example 3C | Example 3D |
|---|---|---|---|---|---|---|---|---|---|---|
| Liquid Crystal Display Device | Polarizing Plate Brightness Enhancement Film | Polarizer | | | Present | | | | Present | |
| | | Polarizing Plate Protective Film | | | Absent | | | | Absent | |
| | | Between Polarizing Plate Protective Film and Reflection Polarizer | λ/4: Rth −240 nm | λ/4: Rth −80 nm | λ/4: Rth −450 nm | λ/4: Rth −50 nm | λ/4: Rth −480 nm | λ/4: Rth −430 nm | λ/4: Rth −230 nm | λ/4: Rth −650 nm |
| | | Difference in Average Refractive Index between Reflection Polarizer and Material Thereon (Adhesive Material or Air) | | | 0.1 | | | | 0.1 | |
| | | Reflection Polarizer | | Three RGB Narrowband Cholesteric Layers | | | | | Three RGB Narrowband Cholesteric Layers | |
| | | Peak Wavelength of First Light Reflecting Layer | | | 450 | | | | 450 | |
| | | Peak Wavelength of Second Light Reflecting Layer | | | 550 | | | | 550 | |
| | | Peak Wavelength of Third Light Reflecting Layer | | | 630 | | | | 630 | |
| | | Arrangement Sequence of Light Reflecting Layer (Sequence from Light Source Side. First Light Reflecting Layer is Referred to as B, Second Light Reflecting Layer is Referred to as G, and Third Light Reflecting Layer is Referred to as R) | | | BGR | | | | GBR | |
| | | Total Thickness of Brightness Enhancement Film (μm) | | | 7.5 | | | | 7.5 | |
| | Backlight | Type | | RGB Narrowband Backlight (Blue LED + Quantum Dot Material) | | | | | RGB Narrowband Backlight (Blue LED + Quantum Dot Material) | |
| | | Main Wavelength | | | 465 | | | | 465 | |
| | | Center Wavelength | | | 535 | | | | 535 | |
| | | Center Wavelength | | | 630 | | | | 630 | |
| Performance | | Front Brightness | 3 | 3 | 3 | 3 | 3 | 3 | 3 | 3 |
| | | Front Contrast | 4 | 4 | 4 | 4 | 4 | 4 | 4 | 4 |
| | | Color Reproducing Region | 4 | 4 | 4 | 4 | 4 | 4 | 4 | 4 |
| | | Color Shift in Inclined Azimuth | 4 | 3 | 3 | 2 | 2 | 4 | 3 | 3 |

| | | | Example 3E | Example 3F | Example 4B | Example 4C | Example 4D | Example 4E | Example 4F |
|---|---|---|---|---|---|---|---|---|---|
| Liquid Crystal Display Device | Polarizing Plate Brightness Enhancement Film | Polarizer | | Present | | | | Present | |
| | | Polarizing Plate Protective Film | | Absent | | | | Absent | |
| | | Between Polarizing Plate Protective Film and Reflection Polarizer | λ/4: Rth −200 nm | λ/4: Rth −680 nm | λ/4: Rth −390 nm | λ/4: Rth −310 nm | λ/4: Rth −450 nm | λ/4: Rth −280 nm | λ/4: Rth −480 nm |
| | | Difference in Average Refractive Index between Reflection Polarizer and Material Thereon (Adhesive Material or Air) | | 0.1 | | | | 0.1 | |
| | | Reflection Polarizer | | Three RGB Narrowband Cholesteric Layers | | | Three RGB Narrowband Cholesteric Layers | | |
| | | Peak Wavelength of First Light Reflecting Layer | | 450 | | | | 450 | |

TABLE 3-continued

|  |  |  |  |  |  |  |  |  |  |
|---|---|---|---|---|---|---|---|---|---|
|  |  | Peak Wavelength of Second Light Reflecting Layer |  | 550 |  |  | 550 |  |  |
|  |  | Peak Wavelength of Third Light Reflecting Layer |  | 630 |  |  | 630 |  |  |
|  |  | Arrangement Sequence of Light Reflecting Layer (Sequence from Light Source Side. First Light Reflecting Layer is Referred to as B, Second Light Reflecting Layer is Referred to as G, and Third Light Reflecting Layer is Referred to as R) |  | GRB |  |  | GRB |  |  |
|  |  | Total Thickness of Brightness Enhancement Film (μm) |  | 7.5 |  |  | 7.5 |  |  |
|  | Backlight | Type |  | RGB Narrowband Backlight (Blue LED + Quantum Dot Material) |  |  | RGB Narrowband Backlight (Blue LED + Quantum Dot Material) |  |  |
|  |  | Main Wavelength |  | 465 |  |  | 465 |  |  |
|  |  | Center Wavelength |  | 535 |  |  | 535 |  |  |
|  |  | Center Wavelength |  | 630 |  |  | 630 |  |  |
| Performance |  | Front Brightness | 3 | 3 | 3 | 3 | 3 | 3 | 3 |
|  |  | Front Contrast | 4 | 4 | 4 | 4 | 4 | 4 | 4 |
|  |  | Color Reproducing Region | 4 | 4 | 4 | 4 | 4 | 4 | 4 |
|  |  | Color Shift in Inclined Azimuth | 2 | 2 | 4 | 3 | 3 | 2 | 2 |

TABLE 4

|  |  |  | Example 5B | Example 5C | Example 5D | Example 5E | Example 5F |
|---|---|---|---|---|---|---|---|
| Liquid Crystal Display Device | Polarizing Plate | Polarizer | | | Present | | |
|  |  | Polarizing Plate Protective Film | | | Absent | | |
|  | Brightness Enhancement Film | Between Polarizing Plate Protective Film and Reflection Polarizer | λ/4: Rth −310 nm | λ/4: Rth −250 nm | λ/4: Rth −360 nm | λ/4: Rth −220 nm | λ/4: Rth −390 nm |
|  |  | Difference in Average Refractive Index between Reflection Polarizer and Material Thereon (Adhesive Material or Air) | | | 0.1 | | |
|  |  | Reflection Polarizer | | Three RGB Narrowband Cholesteric Layers | | | |
|  |  | Peak Wavelength of First Light Reflecting Layer | | | 450 | | |
|  |  | Peak Wavelength of Second Light Reflecting Layer | | | 550 | | |
|  |  | Peak Wavelength of Third Light Reflecting Layer | | | 630 | | |
|  |  | Arrangement Sequence of Light Reflecting Layer (Sequence from Light Source Side. First Light Reflecting Layer is Referred to as B, Second Light Reflecting Layer is Referred to as G, and Third Light Reflecting Layer is Referred to as R) | | | RBG | | |
|  |  | Total Thickness of Brightness Enhancement Film (μm) | | | 7.5 | | |
|  | Backlight | Type | | RGB Narrowband Backlight (Blue LED + Quantum Dot Material) | | | |
|  |  | Main Wavelength | | | 465 | | |
|  |  | Center Wavelength | | | 535 | | |
|  |  | Center Wavelength | | | 630 | | |
| Performance |  | Front Brightness | 3 | 3 | 3 | 3 | 3 |
|  |  | Front Contrast | 4 | 4 | 4 | 4 | 4 |
|  |  | Color Reproducing Region | 4 | 4 | 4 | 4 | 4 |
|  |  | Color Shift in Inclined Azimuth | 4 | 3 | 3 | 2 | 2 |

|  |  |  | Example 6B | Example 6C | Example 6D | Example 6E | Example 6F |
|---|---|---|---|---|---|---|---|
| Liquid Crystal Display Device | Polarizing Plate | Polarizer | | | Present | | |
|  |  | Polarizing Plate Protective Film | | | Absent | | |
|  | Brightness Enhancement Film | Between Polarizing Plate Protective Film and Reflection Polarizer | λ/4: Rth −430 nm | λ/4: Rth −280 nm | λ/4: Rth −520 nm | λ/4: Rth −250 nm | λ/4: Rth −550 nm |
|  |  | Difference in Average Refractive Index between Reflection Polarizer and Material Thereon (Adhesive Material or Air) | | | 0.1 | | |
|  |  | Reflection Polarizer | | Three RGB Narrowband Cholesteric Layers | | | |
|  |  | Peak Wavelength of First Light Reflecting Layer | | | 450 | | |

TABLE 4-continued

|  |  |  |  |  |  |  |  |
|---|---|---|---|---|---|---|---|
|  |  | Peak Wavelength of Second Light Reflecting Layer |  | 550 |  |  |  |
|  |  | Peak Wavelength of Third Light Reflecting Layer |  | 630 |  |  |  |
|  |  | Arrangement Sequence of Light Reflecting Layer (Sequence from Light Source Side. First Light Reflecting Layer is Referred to as B, Second Light Reflecting Layer is Referred to as G, and Third Light Reflecting Layer is Referred to as R) |  | RGB |  |  |  |
|  |  | Total Thickness of Brightness Enhancement Film (μm) |  | 7.5 |  |  |  |
|  | Backlight | Type |  | RGB Narrowband Backlight (Blue LED + Quantum Dot Material) |  |  |  |
|  |  | Main Wavelength |  | 465 |  |  |  |
|  |  | Center Wavelength |  | 535 |  |  |  |
|  |  | Center Wavelength |  | 630 |  |  |  |
| Performance |  | Front Brightness | 3 | 3 | 3 | 3 | 3 |
|  |  | Front Contrast | 4 | 4 | 4 | 4 | 4 |
|  |  | Color Reproducing Region | 4 | 4 | 4 | 4 | 4 |
|  |  | Color Shift in Inclined Azimuth | 4 | 3 | 3 | 2 | 2 |

TABLE 5

| | | Example 2 | Example 3 | Example 4 | Example 5 | Example 6 | Example 10 |
|---|---|---|---|---|---|---|---|
| Liquid Crystal Display Device | Polarizing Plate | Polarizer Polarizing Plate Protective Film | Present TAC Film of Related Art | Present TAC Film of Related Art | Present TAC Film of Related Art | Present TAC Film of Related Art | Present TAC Film of Related Art | Present Absent |
| | Brightness Enhancement Film | Polarizing Plate Protective Film Between Polarizing Plate Protective Film and Reflection Polarizer | Broadband λ/4 (Integrated with Polarizing Plate Protective Film and Reflection Polarizer through Adhesive Agent) | Broadband λ/4 (Integrated with Polarizing Plate Protective Film and Reflection Polarizer through Adhesive Agent) | Broadband λ/4 (Integrated with Polarizing Plate Protective Film and Reflection Polarizer through Adhesive Agent) | Only Adhesive Agent | Broadband λ/4 (Integrated with Polarizing Plate Protective Film and Reflection Polarizer through Adhesive Agent) | Polycarbonate λ/4 Film |
| | | Difference in Average Refractive Index between Reflection Polarizer and Material Thereon (Adhesive Material or Air) | 0.1 | 0.1 | 0.02 | 0.1 | 0.1 | 0.1 |
| | | Reflection Polarizer | Three RGB Narrowband Cholesteric Layers | Three RGB Narrowband Cholesteric Layers | Three RGB Narrowband Cholesteric Layers | RGB Narrowband Dielectric Multilayer Film 1 | Three RGB Narrowband Cholesteric Layers | Three RGB Narrowband Cholesteric Layers |
| | | Peak Wavelength of First Light Reflecting Layer | 450 | 450 | 450 | 460 | 490 | 450 |
| | | Peak Wavelength of Second Light Reflecting Layer | 550 | 550 | 550 | 540 | 560 | 550 |
| | | Peak Wavelength of Third Light Reflecting Layer | 630 | 630 | 630 | 630 | 655 | 630 |
| | | Arrangement Sequence of Light Reflecting Layer (Sequence from Light Source Side. First Light Reflecting Layer is Referred to as B, Second Light Reflecting Layer is Referred to as G, and Third Light Reflecting Layer is Referred to as R) | BGR | BGR | BGR | — | BGR | BGR |
| | | Total Thickness of Brightness Enhancement Film (μm) | 10 | 5 | 7.5 | 10 | 7.5 | 7.5 |
| | Backlight | Type | RGB Narrowband Backlight (Blue LED + Quantum Dot Material) | RGB Narrowband Backlight (Blue LED + Quantum Dot Material) | RGB Narrowband Backlight (Blue LED + Quantum Dot Material) | RGB Narrowband Backlight (Blue LED + Quantum Dot Material) | RGB Narrowband Backlight (Blue LED + Quantum Dot Material) | RGB Narrowband Backlight (Blue LED + Quantum Dot Material) |
| | | Main Wavelength | 465 | 465 | 465 | 465 | 465 | 465 |
| | | Center Wavelength | 535 | 535 | 535 | 535 | 535 | 535 |
| | | Center Wavelength | 630 | 630 | 630 | 630 | 630 | 630 |
| Performance | | Front Brightness | 4 | 3 | 5 | 3 | 3 | 3 |
| | | Front Contrast | 3 | 4 | 4 | 4 | 3 | 4 |
| | | Color Reproducing Region | 4 | 4 | 4 | 4 | 4 | 4 |
| | | Color Shift in Inclined Azimuth | — | — | — | — | — | — |

From Tables 2 to 5 described above, it was found that, when the optical sheet member of the present invention used as the backlight side polarizing plate was incorporated in the image display device using the RGB narrowband backlight, all of the front brightness, the front contrast, and the color reproducing region were improved.

In contrast, from Comparative Example 1, it was found that, when the optical sheet member used as the backlight side polarizing plate which was not within the scope of the present invention and in which the known DBEF of the related art was used as the reflection polarizer was incorporated in the image display device using the LED of the related art as the backlight, all of the front brightness, the front contrast, and the color reproducing region were required to be enhanced.

From Comparative Example 2, it was found that, when the optical sheet member used as the backlight side polarizing plate which was not within the scope of the present invention and in which the reflection polarizer formed by laminating the five layers formed by fixing the cholesteric liquid crystals having a broadband reflection peak was used was incorporated in the image display device using the RGB narrowband backlight, all of the front brightness, the front contrast, and the color reproducing region were required to be enhanced.

Furthermore, in Examples 1 to 4, 6, 10, 1A to 1F, 2A to 2F, 3A to 3F, 4A to 4F, 5A to 5F, and 6A to 6F, the emission (transmission and reflection) of the circular polarization light from the reflection polarizer, and in Example 5, the emission (transmission and reflection) of the linear polarization light from the reflection polarizer were confirmed by using the method described herein.

Furthermore, a wavelength selective filter for a blue color which selectively transmitted light having a wavelength shorter than 460 nm was disposed on the backlight unit of the liquid crystal display device of Example 1, and thus similarly, excellent evaluation results were obtained. In addition, a wavelength selective filter for a red color which selectively transmitted light having a wavelength longer than 630 nm was disposed on the backlight unit of the liquid crystal display device of Example 1, and thus similarly, excellent evaluation results were obtained.

Example 11

Next, in the manufacturing of a cellulose acylate film disclosed in Example 1 of JP2011-121327A, quantum rods emitting fluorescent light of green light having a center wavelength of 560 nm and a half-value width of 40 nm and red light having a center wavelength of 640 nm and a half-value width of 40 nm were dispersed in cellulose acylate in the amount of 0.1 mass % when the blue light of the blue light emitting diode was incident, and thus a quantum rod-dispersed and stretched cellulose acylate film was prepared. The polarization degree of this quantum rod-dispersed and stretched cellulose acylate film was 80%.

A sample of Example 11 was obtained by the same method as that in Example 1 except that the backlight included the blue light emitting diode and the quantum rod-dispersed and stretched cellulose acylate film described above in Example 1.

Performance evaluation was performed as with Example 1, and the same results were obtained except that the evaluation of the front brightness was 5, and thus it was found that it was possible to obtain a more excellent result of maintaining the polarization degree.

Examples 11A to 11F, 12A to 12F, 13A to 13F, 14A to 14F, 15A to 15F, and 16A to 16F Next, samples of Examples 11A to 11F, 12A to 12F, 13A to 13F, 14A to 14F, 15A to 15F, and 16A to 16F were obtained by the same method as those in Examples 1A to 1F, 2A to 2F, 3A to 3F, 4A to 4F, 5A to 5F, and 6A to 6F except that the backlight included the blue light emitting diode and the quantum rod-dispersed and stretched cellulose acylate film described above in Examples 1A to 1F, 2A to 2F, 3A to 3F, 4A to 4F, 5A to 5F, and 6A to 6F. Performance evaluation was performed as with Example 1, and the same results obtained except that the evaluation of the front brightness was 4, and thus it was found that it was possible to obtain a more excellent result of maintaining the polarization degree.

EXPLANATION OF REFERENCES

1: backlight side polarizing plate
2: retardation film
3: polarizer (A)
4: polarizing plate protective film
11: brightness enhancement film
12: λ/4 plate (C)
13: reflection polarizer (B)
14, 14a, 14b, 14c: layer formed by fixing narrowband cholesteric liquid crystalline phase
15: dielectric multilayer film
20: adhesive layer (adhesive agent)
21: optical sheet member
31: backlight unit (R, G, B narrowband backlight unit)
41: thin layer transistor substrate
42: liquid crystal cell
43: color filter substrate
44: display side polarizing plate
51: image display device

What is claimed is:
1. An image display device, comprising:
an optical sheet member, comprising:
 a polarizing plate including a polarizer (A);
 a brightness enhancement film including a reflection polarizer (B); and
 a λ/4 plate (C),
 wherein the reflection polarizer (B) includes
 a first light reflecting layer which has a reflection center wavelength in a wavelength range of 430 nm to 480 nm, has a peak of reflectivity having a half-value width of less than or equal to 100 nm, and is formed by fixing a cholesteric liquid crystalline phase emitting circular polarization light,
 a second light reflecting layer which has a reflection center wavelength in a wavelength range of 500 nm to 600 nm, has a peak of reflectivity having a half-value width of less than or equal to 100 nm, and is formed by fixing the cholesteric liquid crystalline phase emitting circular polarization light, and
 a third light reflecting layer which has a reflection center wavelength in a wavelength range of 600 nm to 650 nm, has a peak of reflectivity having a half-value width of less than or equal to 100 nm, and is formed by fixing the cholesteric liquid crystalline phase emitting circular polarization light, the brightness enhancement film includes the λ/4 plate (C) satisfying Expression (2) described below between the polarizer (A) and the reflection polarizer (B), 550 nm/4−25 nm<$Re$(550)<550 nm/4+25 nm, and    Expression (2)

in the expression, Re(λ) represents retardation having an unit of nm in an in-plane direction at a wavelength of λ nm; and a backlight unit,
wherein the backlight unit includes
a light source emitting blue light which has a light emitting center wavelength in a wavelength range of 430 nm to 480 nm, and has a peak of light emitting intensity having a half-value width of less than or equal to 100 nm,
green light which has a light emitting center wavelength in a wavelength range of 500 nm to 600 nm, and has a peak of light emitting intensity having a half-value width of less than or equal to 100 nm,
and red light which has a light emitting center wavelength in a wavelength range of 600 nm to 650 nm, and has a peak of light emitting intensity having a half-value width of less than or equal to 100 nm, and
the backlight unit includes a reflection member performing conversion of a polarization state of light which is emitted from the light source and is reflected on the optical sheet member and reflection of the light in a rear portion of the light source,
wherein the optical sheet member has the reflection polarizer (B), the λ/4 plate (C), and the polarizer (A) in this order from the backlight side.

2. The image display device according to claim 1, wherein the λ/4 plate (C) further satisfies Expressions (1), (3), and (4) described below, 450 nm/4−25 nm<$Re$(450)<450 nm/4+25 nm,    Expression (1)

630 nm/4−25 nm<$Re$(630)<630 nm/4+25 nm,    Expression (3)

$Re$(450)<$Re$(550)<$Re$(630), and    Expression (4)

in the expression, Re(λ) represents retardation having an unit of nm in an in-plane direction at a wavelength of λ nm.

3. The image display device according to claim 1, wherein the polarizing plate and the reflection polarizer (B) are laminated in direct contact with each other or through an adhesive layer.

4. The image display device according to claim 1, wherein the polarizing plate, the λ/4 plate (C), and the reflection polarizer (B) are sequentially laminated in direct contact with each other or through an adhesive layer.

5. The image display device according to claim 1, wherein a difference in refractive indexes between the reflection polarizer (B) and a layer in direct contact with the reflection polarizer (B) on the polarizing plate side is less than or equal to 0.15.

6. The image display device according to claim 1, wherein a film thickness of the brightness enhancement film is 5 μm to 10 μm.

7. The image display device according to claim 1, wherein the light source includes
a blue light emitting diode emitting the blue light, and
a fluorescent material emitting the green light and the red light when the blue light of the blue light emitting diode is incident thereon.

8. The image display device according to claim 7, wherein the fluorescent material is a quantum dot member, and
the quantum dot member is arranged between the optical sheet member and the blue light emitting diode.

9. The image display device according to claim 8, wherein the quantum dot member emits fluorescent light holding at least a part of polarization properties of an incidence ray.

10. The image display device according to claim 1, further comprising:
a liquid crystal cell.

11. An optical sheet member, comprising:
a polarizing plate including a polarizer (A); and
a brightness enhancement film including a reflection polarizer (B),
wherein the reflection polarizer (B) is a dielectric multilayer film which has a reflection center wavelength in a wavelength range of 430 nm to 480 nm, a peak of reflectivity having a half-value width of less than or equal to 100 nm, a reflection center wavelength in a wavelength range of 500 nm to 600 nm, a peak of reflectivity having a half-value width of less than or equal to 100 nm, a reflection center wavelength in a wavelength range of 600 nm to 650 nm, and a peak of reflectivity having a half-value width of less than or equal to 100 nm, and emits linear polarization light.

12. The optical sheet member according to claim 11, wherein the polarizing plate and the reflection polarizer (B) are laminated in direct contact with each other or through an adhesive layer.

13. The optical sheet member according to claim 11, wherein a difference in refractive indexes between the reflection polarizer (B) and a layer in direct contact with the reflection polarizer (B) on the polarizing plate side is less than or equal to 0.15.

* * * * *